(12) United States Patent
Chang et al.

(10) Patent No.: US 8,558,817 B2
(45) Date of Patent: Oct. 15, 2013

(54) OPTICAL TOUCH-CONTROL SYSTEM

(75) Inventors: Kuo-Wen Chang, Taichung (TW); Min-Wei Lee, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 221 days.

(21) Appl. No.: 13/233,306

(22) Filed: Sep. 15, 2011

(65) Prior Publication Data

US 2012/0249478 A1    Oct. 4, 2012

(30) Foreign Application Priority Data

Mar. 29, 2011  (TW) .............................. 100110759 A

(51) Int. Cl.
*G06F 3/042* (2006.01)
(52) U.S. Cl.
USPC .......................... 345/175; 345/173; 178/18.09
(58) Field of Classification Search
USPC ..................... 345/173–179; 178/18.01–18.09
See application file for complete search history.

(56) References Cited

U.S. PATENT DOCUMENTS

| | | | |
|---|---|---|---|
| 4,144,449 A | 3/1979 | Funk et al. | |
| 4,507,557 A | 3/1985 | Tsikos | |
| 5,196,835 A | 3/1993 | Blue et al. | |
| 6,972,401 B2 | 12/2005 | Akitt et al. | |
| 7,202,860 B2 | 4/2007 | Ogawa | |
| 7,232,986 B2 | 6/2007 | Worthington et al. | |
| 2010/0265215 A1* | 10/2010 | Lai ................................ | 345/175 |

* cited by examiner

*Primary Examiner* — Amare Mengistu
*Assistant Examiner* — Premal Patel
(74) *Attorney, Agent, or Firm* — Dickstein Shapiro LLP

(57) ABSTRACT

An optical touch-control includes: four light-guide modules cooperating to define a touch-control zone, each of the light-guide modules including a light-guide strip that has a light-entry surface oriented toward a respective one of first and second ones of corners defined by the light-guide modules, and a light-exit surface that is oriented toward the touch-control zone; two light-emitting modules disposed in the first one of the corners and two light-emitting modules disposed in the second one of the corners, each of the light-emitting modules being oriented toward the light-entry surface of a corresponding one of the light-guide modules, light that enters each of the light-guide modules via the light-entry surface thereof exiting from the light-guide module via the light-exit surface thereof; and three image acquisition modules disposed respectively in the first and second ones of the corners and a remaining one of the corners, and oriented toward the touch-control zone.

8 Claims, 22 Drawing Sheets

OPTICAL TOUCH-CONTROL SYSTEM

CROSS-REFERENCE TO RELATED APPLICATION

This application claims priority of Taiwanese Application No. 100110759, filed on Mar. 29, 2011.

BACKGROUND OF THE INVENTION

1. Field of the Invention

The present invention relates to a touch-control system, more particularly to an optical touch-control system.

2. Description of the Related Art

U.S. Pat. Nos. 4,507,557 and 5,196,835 disclose conventional optical touch control systems, each of which has a plurality of longitudinal reflecting elements that cooperate to define a rectangular touch-control zone, and a plurality of image acquisition modules and a plurality of light-emitting modules that are disposed at corners of the touch-control zone and oriented toward the touch-control zone, respectively. The reflecting elements serve to reflect light from the light-emitting modules. In such a configuration, each of images captured by the image acquisition modules has a bright band portion, which is attributed to light emitted by the light-emitting modules and light reflected by the reflecting elements. During operation, when a user disposes a pointer (e.g., a finger of the user) in the touch-control zone, light in the touch-control zone is partially obstructed by the pointer such that the bright band portion of each of images captured by the image acquisition modules has a pointer section that is relatively dark and that corresponds in shape to the pointer. Subsequently, position of the pointer relative to the touch-control zone may be determined according to position of pointer the section relative to the bright band portion in each of the images thus captured.

However, when the pointer is disposed too close to one of the image acquisition modules, the pointer may be over-illuminated by light that is emitted by the light-emitting module corresponding to said one of the image acquisition modules, rendering the pointer section of the bright band portion indistinguishable from remaining sections of the bright band portion. As a result, position of the pointer thus determined may be inaccurate. In addition, a shadow of the pointer may also have an adverse influence upon the accuracy of the position of the pointer thus determined due to positional differences among optical axes of the light-emitting modules and the image acquisition modules.

To alleviate the aforesaid drawbacks, U.S. Pat. No. 6,100,538 discloses an optical touch-control system including a plurality of longitudinal light-absorbing elements that cooperate to define a rectangular touch-control zone, and a plurality of image acquisition modules that are oriented toward the touch-control zone, respectively. In such a configuration, each of images captured by the image acquisition modules is plain dark. During operation, when a user disposes a light-emitting pointer in the touch-control zone, each of images captured by the image acquisition modules will have a pointer section that is relatively bright and that corresponds in shape to the pointer. Subsequently, position of the pointer relative to the touch-control zone may be determined according to position of the section pointer in each of the images thus captured. In practice, the pointer may be a stylus that is capable of emitting light through reflection of light from a light source.

However, since the portions of the image corresponding to borders of the touch-control zone may be indistinguishable from remaining portions of the image due to lack of illumination, position of the pointer relative to the touch-control zone thus determined may be inaccurate.

U.S. Pat. No. 7,202,860 discloses an optical touch-control system that is similar to those disclosed in U.S. Pat. Nos. 4,507,557 and 5,196,835. However, the image acquisition modules have a field of view with a border line providing white and black contrast.

When the optical touch-control system is operated in a first mode, a user may dispose a pointer (e.g., a finger of the user) in the touch-control zone to obstruct light in the touch-control zone such that the band portion of each of images captured by the image acquisition modules has a pointer section that is relatively dark and that corresponds in shape to the pointer. The subsequent determination of position of the pointer relative to the touch-control zone is similar to those in U.S. Pat. Nos. 4,507,557 and 5,196,835.

When the optical touch-control system is operated in a second mode, a user may dispose a light-emitting pointer (e.g., the tip of the aforesaid stylus) in the touch-control zone such that the band portion of each of images captured by the image acquisition modules has a pointer section that is relatively bright and that corresponds in shape to the pointer. The subsequent determination of position of the pointer relative to the touch-control zone is similar to that in U.S. Pat. No. 6,100,538.

However, the problem of reduced accuracy of the determined position due to over illumination of the pointer when the pointer is disposed too close to one of the image acquisition modules remains unsolved in the optical touch-control system of U.S. Pat. No. 7,202,860.

Furthermore, for each of the aforesaid optical touch-control systems disclosed in U.S. Pat. Nos. 4,507,557, 5,196,835, and 7,202,860, images captured by each of the image acquisition modules may contain portions corresponding respectively to light emitted by the light-emitting modules that correspond to remaining ones of the image acquisition modules, which may reduce accuracy of the determined position of the pointer. That is to say, for each of the image acquisition modules, the light-emitting modules corresponding to the remaining ones of the image acquisition modules may be regarded as sources of interference.

To solve the aforementioned problem of interference, U.S. Pat. No. 7,232,986 discloses an optical touch-control system wherein, for each of the image acquisition modules to only receive light emitted by the corresponding light-emitting module and to filter light emitted by remaining ones of the light-emitting modules, the image acquisition module must be mounted with an optical filter to block undesired light.

However, optical filters generally have higher production costs and reduce brightness of light that passes therethrough.

In view of the above drawbacks, U.S. Pat. No. 4,144,449 discloses an optical touch-control system that includes a plurality of light-emitting modules that cooperate to define a touch-control zone, and a plurality of image acquisition modules that are disposed respectively at corners of the touch-control zone. Each of the light-emitting modules includes a fluorescent lamp serving as a light-emitting strip, and a pair of structures disposed such that light emitted from the light-emitting strip is directed toward the touch-control zone. Moreover, U.S. Pat. No. 6,972,401 discloses an optical touch-control system similar to that of U.S. Pat. No. 4,144,449. However, in U.S. Pat. No. 6,972,401, each of the light-emitting modules includes a plurality of light-emitting diodes (LEDs) arranged in a longitudinal direction along the light-emitting module, and a diffuser for diffusing light emitted by the LEDs such that light emitted by the LEDs becomes generally continuous illumination.

However, the optical touch-control systems disclosed in U.S. Pat. Nos. 4,144,449 and 6,972,401 have relatively large dimensions and high power consumptions.

SUMMARY OF THE INVENTION

Therefore, an object of the present invention is to provide an optical touch-control system capable of alleviating the aforesaid drawbacks of the prior art.

Accordingly, an optical touch-control system of the present invention includes:

a light-guide unit including four light-guide modules that cooperate to define a touch-control zone and four corners, each of the light-guide modules including a light-guide strip having opposite first and second ends, a light-entry surface that is disposed at the first end, and a light-exit surface that extends between the first and second ends and that is oriented toward the touch-control zone, wherein for each of two of the light-guide modules that define a first one of the corners, the light-entry surface of the light-guide strip of the light-guide module is oriented toward the first one of the corners, and wherein for each of remaining two of the light-guide modules that define a second one of the corners diagonally opposite to the first one of the corners, the light-entry surface of the light-guide strip of the light-guide module is oriented toward the second one of the corners;

a light-emitting unit including four light-emitting modules, two of which are disposed in the first one of the corners, and remaining two of which are disposed in the second one of the corners, each of the light-emitting modules being oriented toward the light-entry surface of the light-guide strip of a corresponding one of the light-guide modules disposed in the same one of the corners, light that enters each of the light-guide modules via the light-entry surface thereof exiting from the light-guide module via the light-exit surface thereof; and a sensor unit including first, second, and third image acquisition modules disposed respectively in the first and second ones of the corners and a remaining one of the corners, each of the first, second, and third image acquisition modules being oriented toward the touch-control zone.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
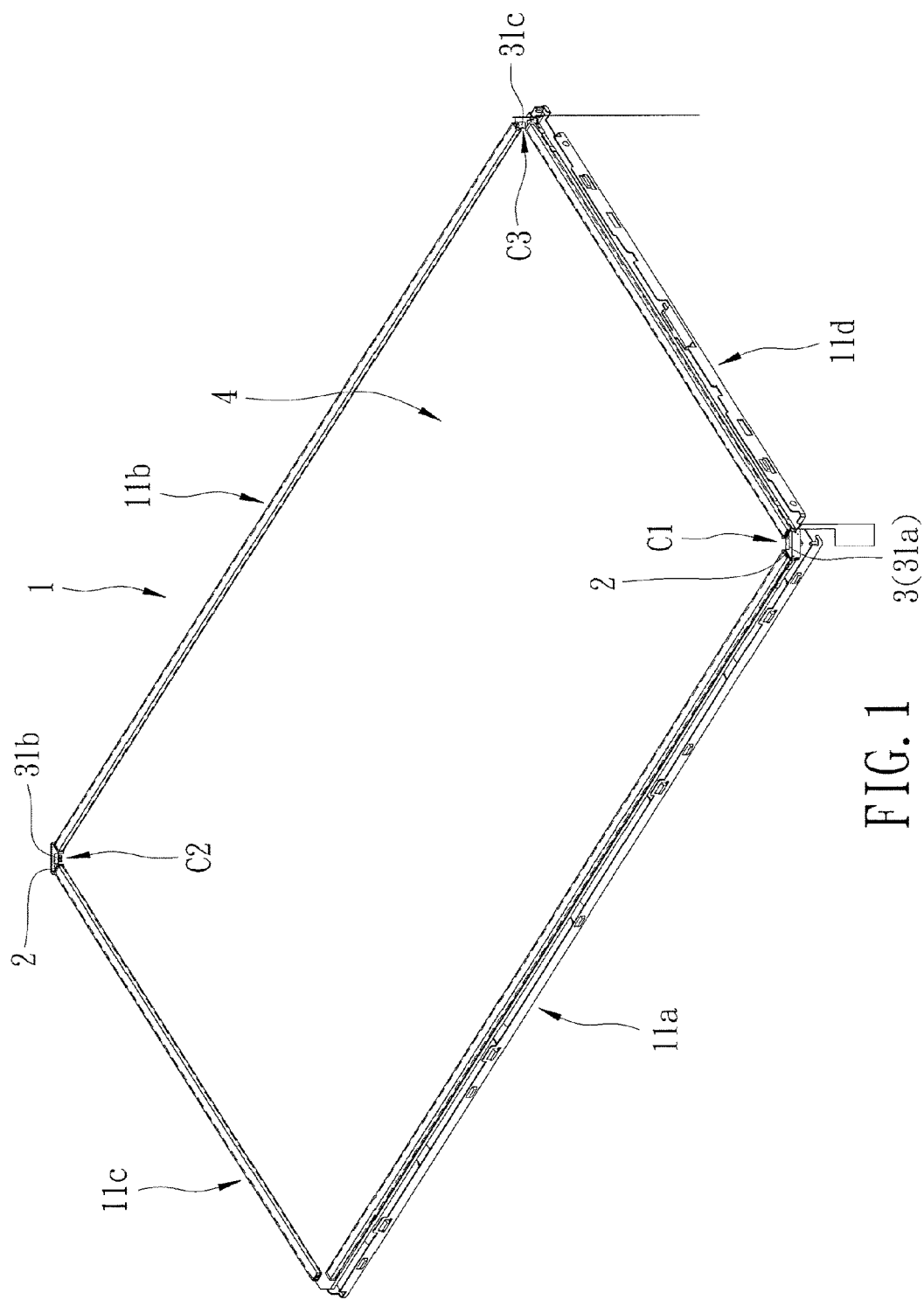
FIG. 1 is a perspective view of the preferred embodiment of an optical touch-control system according to the present invention.

Referring to FIG. 1, the first preferred embodiment of an optical touch-control system according to the present invention includes a light-guide unit 1, a light-emitting unit 2, and a sensor unit 3.

The light-guide unit 1 includes first and second light-guide modules 11a, 11b that are disposed opposite and parallel to each other and that have a first length, and third and fourth light-guide modules 11c, 11d that are disposed opposite and parallel to each other and that have a second length shorter than the first length. The first and second light-guide modules 11a, 11b are disposed perpendicular to the third and fourth light-guide modules 11c, 11d such that each of the light-guide modules 11a-11d forms a 90-degree angle with an adjacent one of the light-guide modules 11a-11d. The light-guide modules 11a-11d cooperate to define a rectangular touch-control zone 4.

Figure 2:
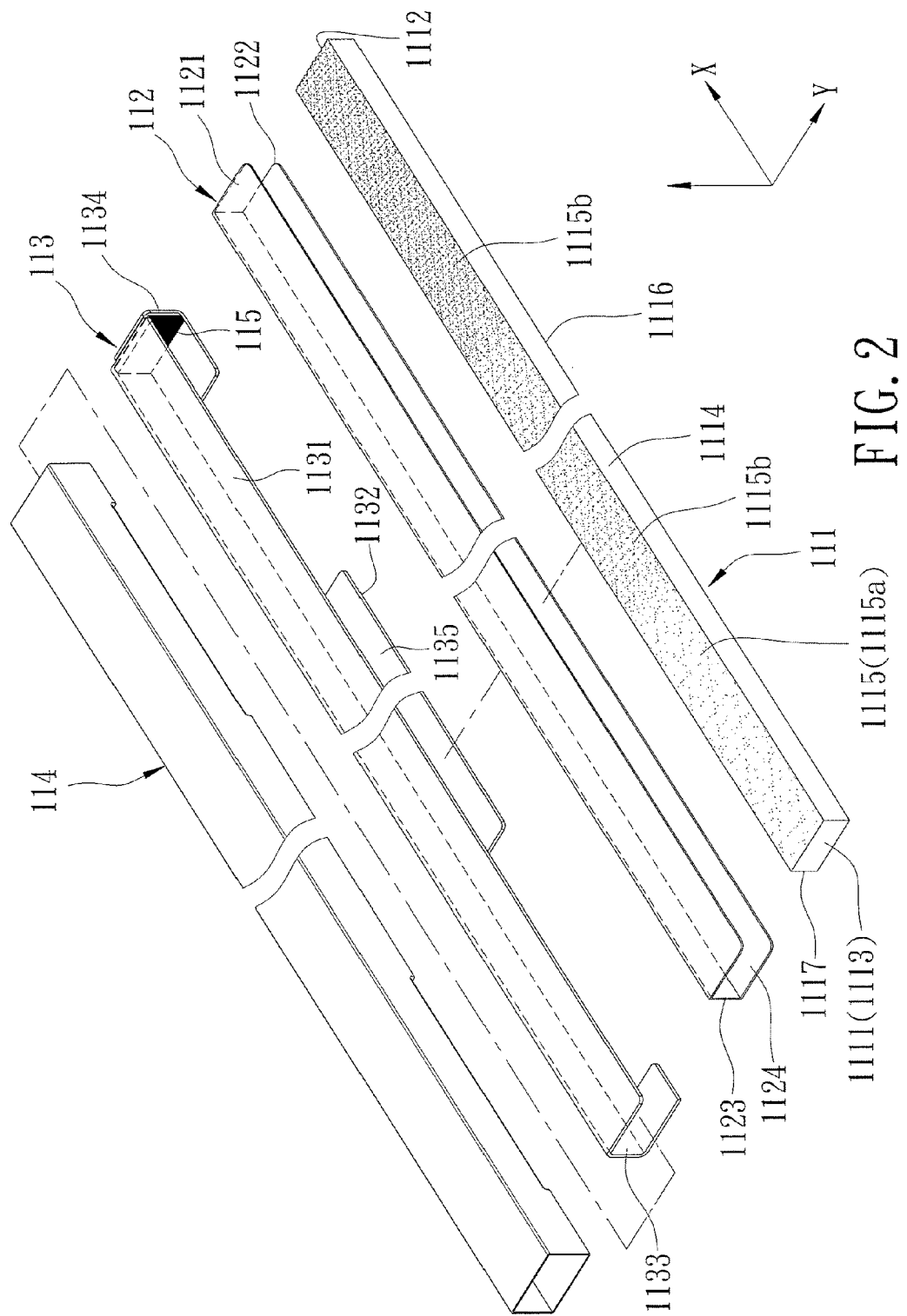
FIG. 2 is an exploded perspective view of one of first and second light-guide modules of the optical touch-control system.
Figure 3:
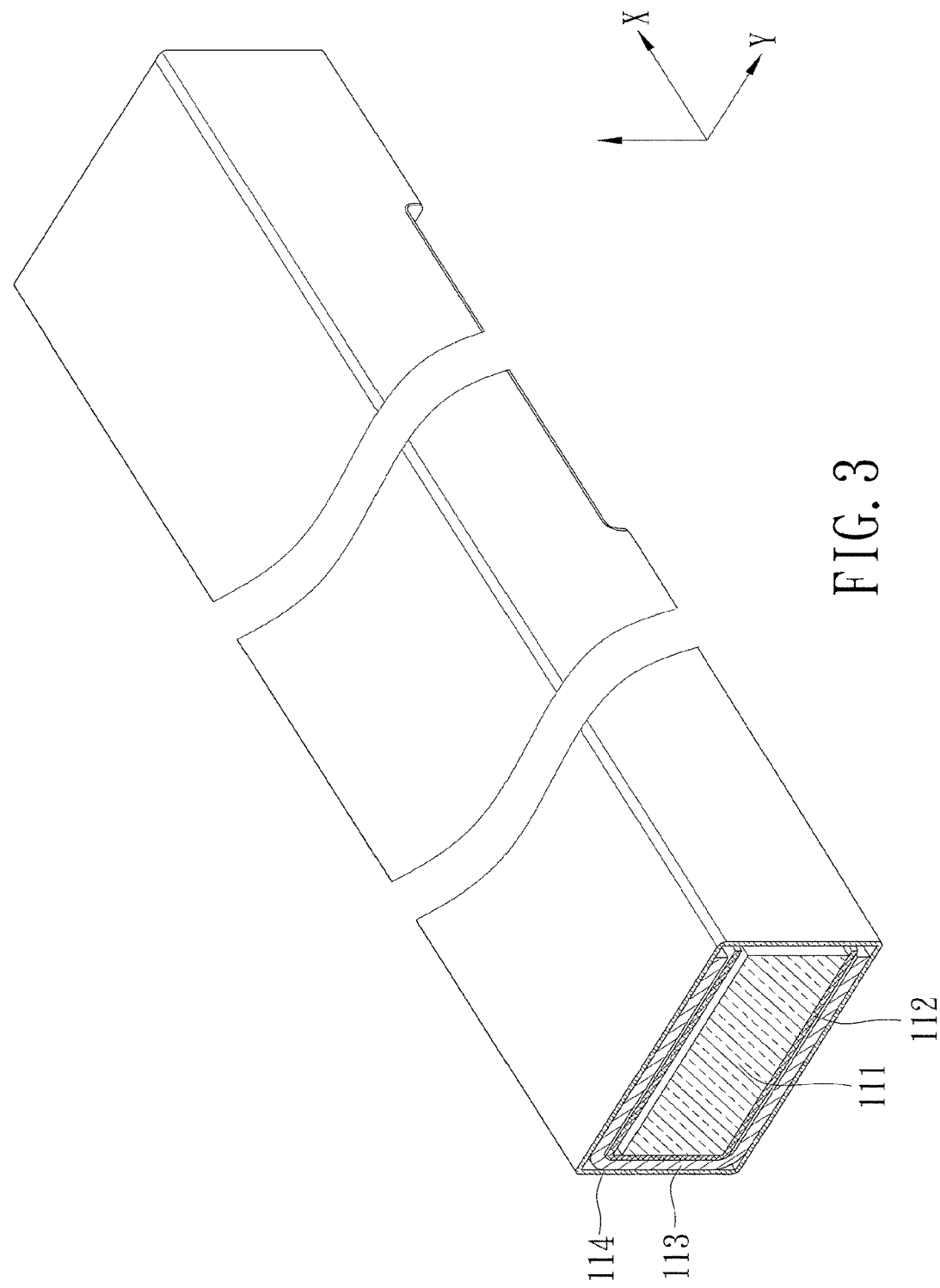
FIG. 3 is an assembled perspective view of one of the first and second light-guide modules.

Referring to FIGS. 2 and 3, each of the light-guide modules 11a-11d includes a light-guide strip 111, a reflecting element 112, a housing 113, a diffuser 114, and a light-extinguishing element 115.

The light-guide strip 111 includes: a first end 1111; a second end 1112 opposite to the first end 1111; a light-entry surface 1113 disposed at the first end 1111; a light-exit surface 1114 extending in a first direction (X), extending between the first and second ends 1111, 1112, and facing toward the touch-control zone 4; first and second working surfaces 1115, 1116 disposed parallel to each other, extending in the first direction (X), and extending between the first and second ends 1111, 1112; and a rear surface 1117 disposed opposite to the light-exit surface 1114, extending in the first direction (X), and extending between the first and second ends 1111, 1112.

In the present embodiment, the first working surface 1115 has a width of 4 mm, the light-exit surface 1114 has a height of 1.6 mm, and the light-guide strip 111 resembles a board having a rectangular cross-section. In other words, the light-guide strip 111 has cross-sectional dimensions that are non-varying along the first direction (X).

In the present embodiment, the light-entry surface 1113 is a polished surface for achieving total reflection of light and reducing light leakage. The second end 1112 is formed with a roughened surface through which a major portion of light may be directly refracted to exit the light-guide strip 111, thereby preventing excessive light from exiting through a portion of the light-exit surface 1114 proximate to the second end 1112.

Since the rear surface 1117 is disposed parallel and opposite to the light-exit surface 1114, and the first and second working surfaces 1115, 1116 are disposed parallel and opposite to each other and disposed perpendicular to the light-exit surface 1114 and the rear surface 1117, the light-exit surface 1114 has a substantially rectangular profile when viewed from a second direction (Y) that is perpendicular to the first direction (X).

Figure 4:
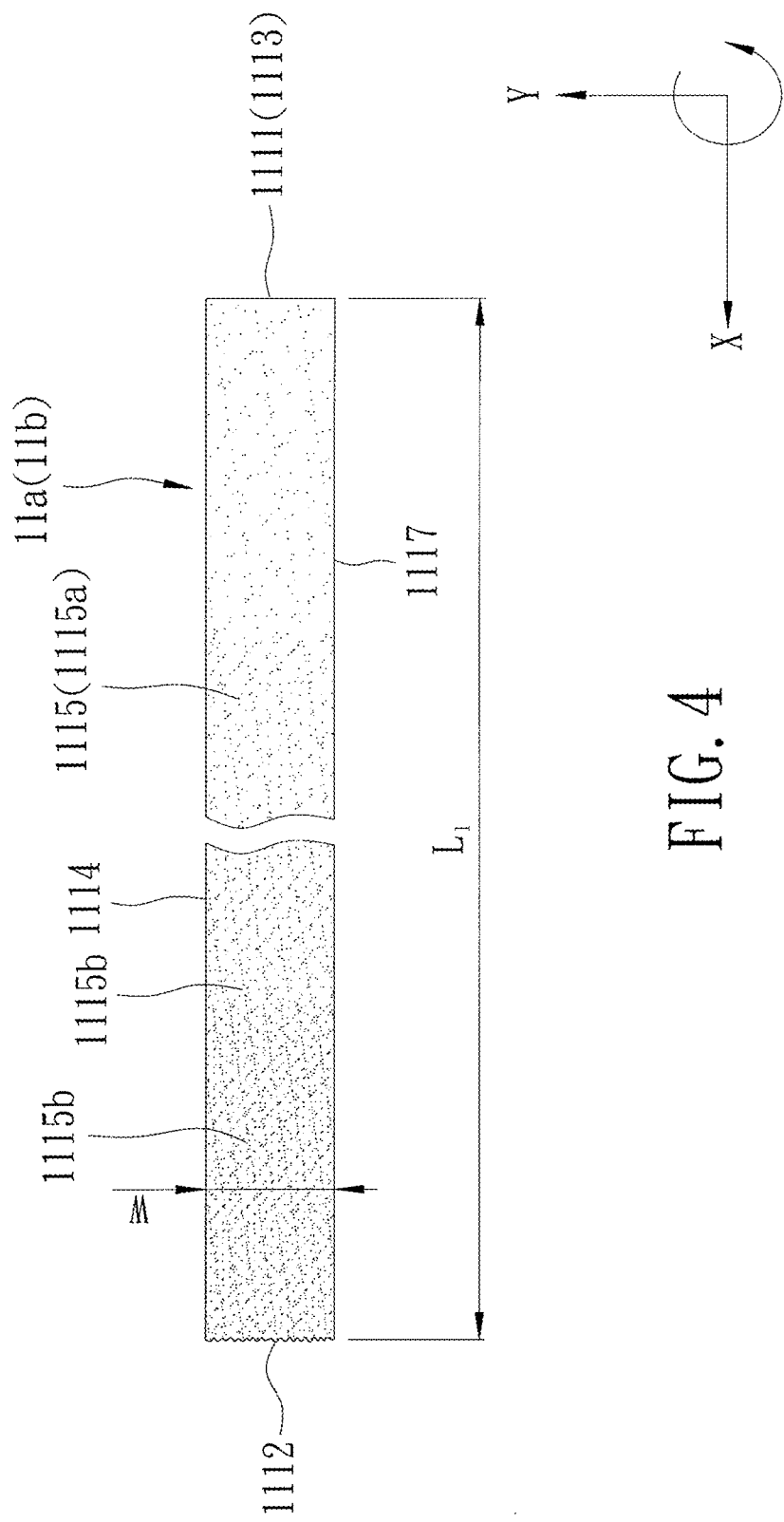
FIG. 4 is a schematic view to show a light-guide strip of one of the first and second light-guide modules.

Referring to FIG. 4, the light-guide strip 111 of each of the first and second light-guide modules 11a, 11b has the first length, which is marked by "$L_1$" and is 475 mm in this embodiment. The first working surface 1115 has a width of 4 mm and a length-width ratio not smaller than 50, and the light-exit surface 1114 has a height of 1.6 mm. The first working surface 1115 has a substantially rectangular profile when viewed from a third direction (Z) that is perpendicular to the first and second directions (X, Y). In the present embodiment, the length-width ratio is 475/4≈119. The first working surface 1115 defines a light-scatter zone 1115a having a width (W) in the second direction (Y) that is non-varying along the first direction (X), and a plurality of micro-scatter structures 1115b. That is to say, the light-scatter zone 1115a is also rectangular. The light-scatter zone 1115a preferably occupies the entire length of the first working surface 15 (i.e., the first length).

Figure 5:
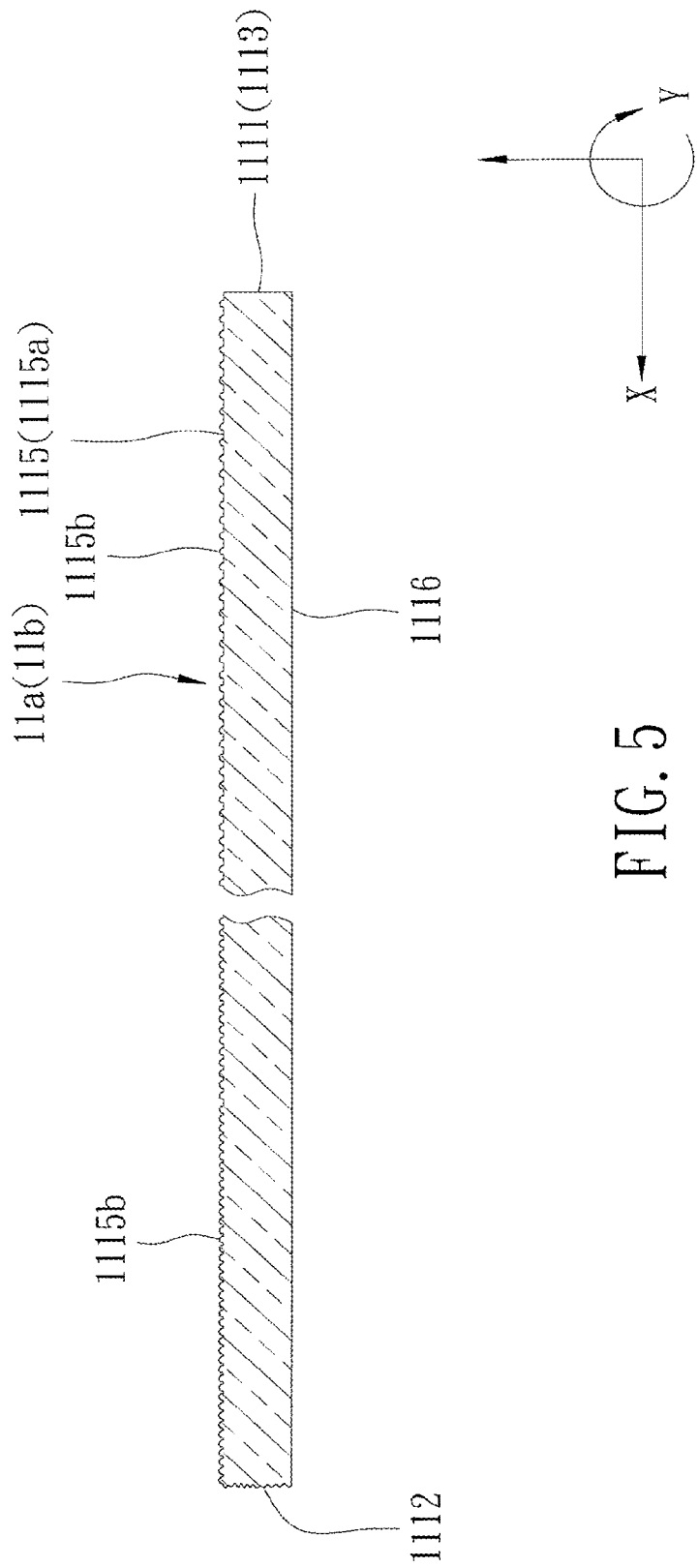
FIG. 5 is a sectional view of the light-guide strip of said one of the first and second light-guide modules.
Figure 6:
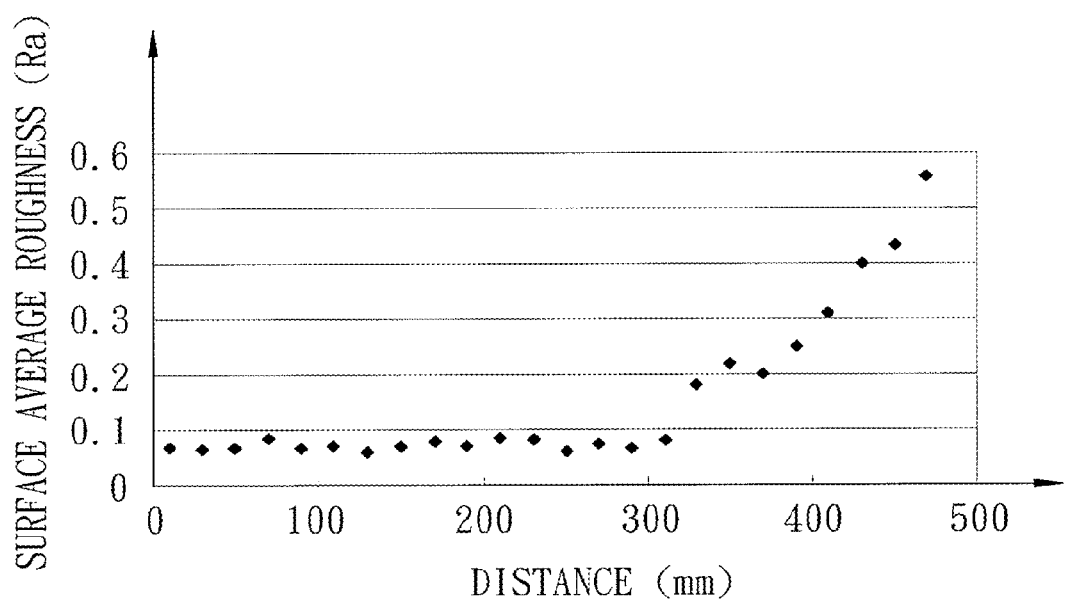
FIG. 6 is a plot of surface average roughness of a light-scatter zone defined by a first working surface of the light-guide strip of said one of the first and second light-guide modules at different distances from a first end of the light-guide strip toward a second end of the same.

In this embodiment, the first working surface 1115 is formed with a plurality of irregular protrusions within the light-scatter zone 1115a, the irregular protrusions serving as the micro-scatter structures 1115b. Referring to FIG. 5, since the irregular protrusions have a distribution density that varies along the first direction (X), the light-scatter zone 1115a has a surface average roughness "Ra" that varies along the first direction (X). Referring to Table 1 below and FIG. 6, in this embodiment, the surface average roughness "Ra" increases along the first direction (X) from the first end 1111 toward the second end 1112. It is to be noted that "d" represents a distance in millimeters from the first end 1111 toward the second end 1112.

TABLE 1

| d(mm) | 10 | 30 | 50 | 70 | 90 | 110 | 130 | 150 |
|---|---|---|---|---|---|---|---|---|
| Ra | 0.067 | 0.062 | 0.068 | 0.083 | 0.067 | 0.07 | 0.061 | 0.07 |
| d(mm) | 170 | 190 | 210 | 230 | 250 | 270 | 290 | 310 |
| Ra | 0.076 | 0.07 | 0.084 | 0.079 | 0.06 | 0.074 | 0.063 | 0.079 |
| d(mm) | 330 | 350 | 370 | 390 | 410 | 430 | 450 | 470 |
| Ra | 0.18 | 0.215 | 0.199 | 0.25 | 0.311 | 0.399 | 0.434 | 0.558 |

Since the micro-scatter structures 1115b are formed by the irregular protrusions with a distribution density that increases from the first end 1111 toward the second end 1112, and since the distribution density of the irregular protrusions have a positive relation to scattering of light by the irregular protrusions, scattering of light in a region of the light-scatter zone 1115a closer to the second end 1112 is greater compared to another region of the light-scatter zone 1115a closer to the first end 1111. It is worth noting that, in addition to the distribution density, other factors such as heights and outer radii of the irregular protrusions may affect variation of the surface average roughness "Ra".

Figure 7:
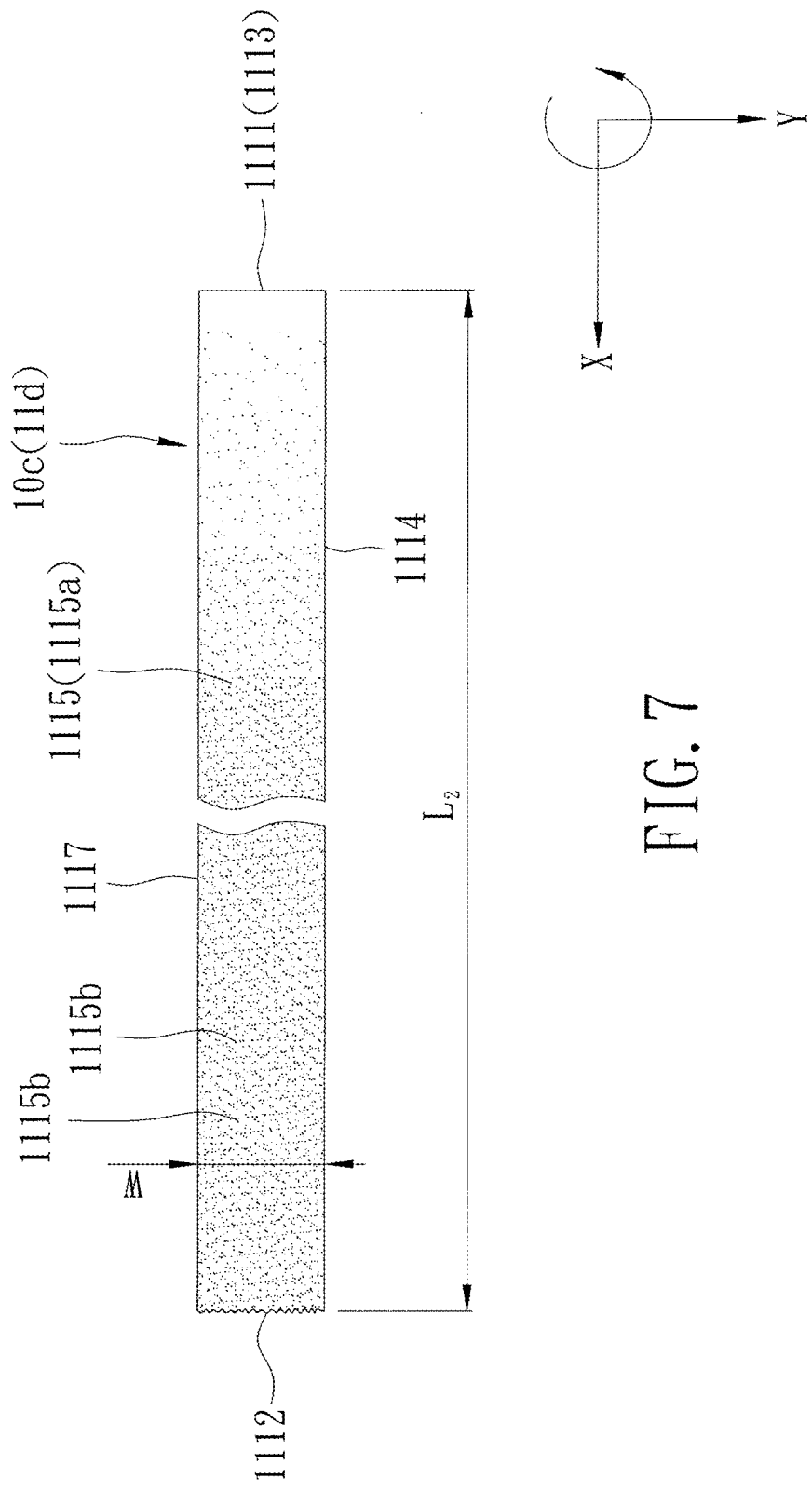
FIG. 7 is a schematic view to show a light-guide strip of one of third and fourth light-guide modules.
Figure 8:
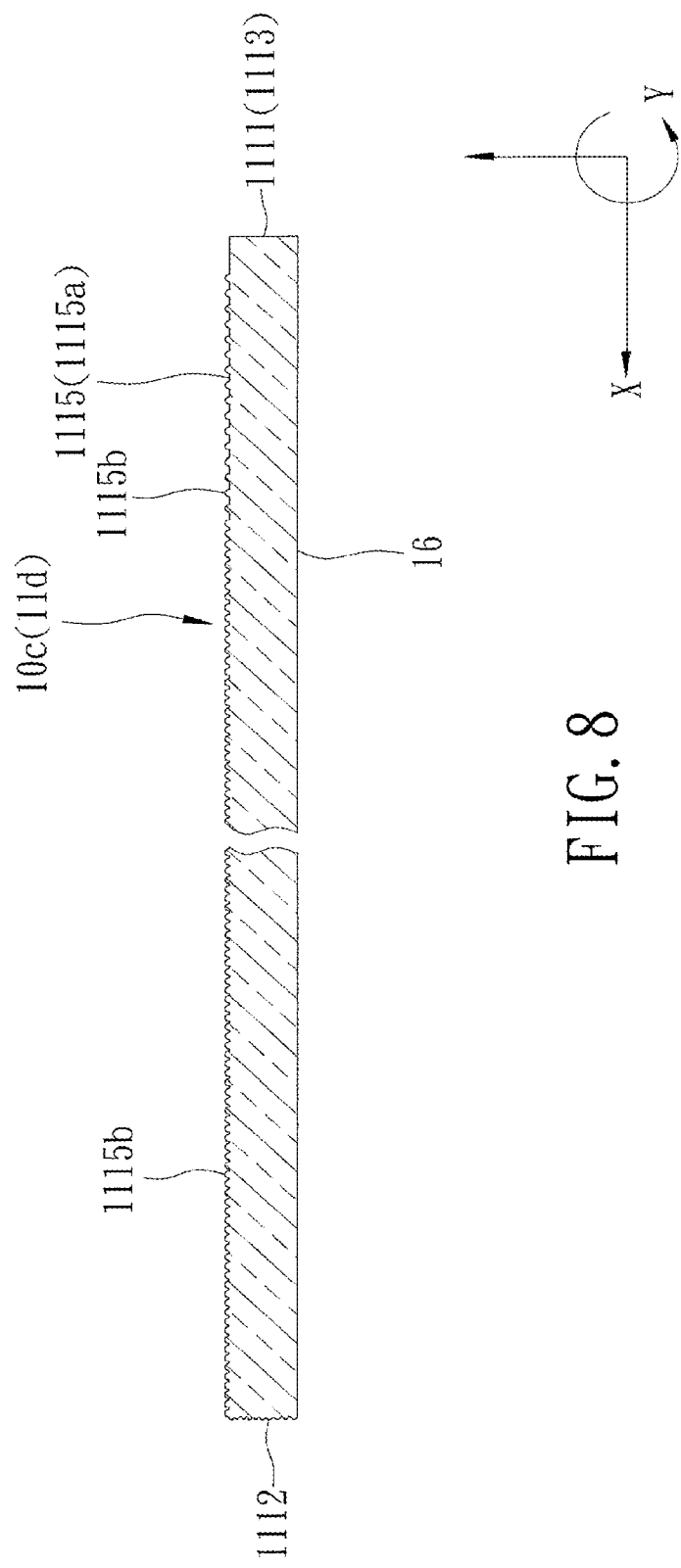
FIG. 8 is a sectional view to show the light-guide strip of said one of the third and fourth light-guide modules.
Figure 9:
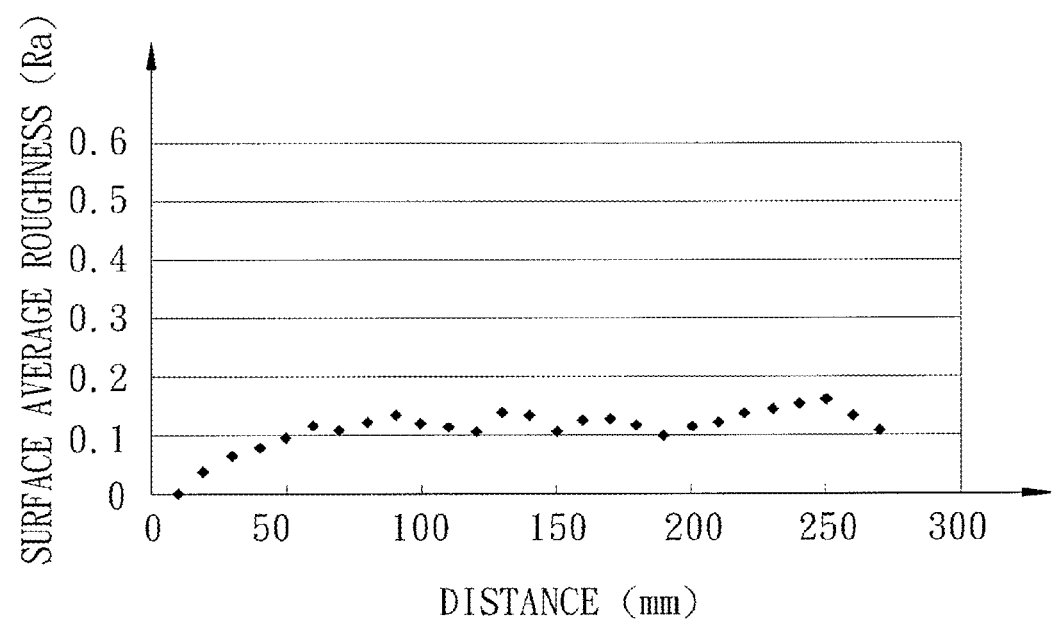
FIG. 9 is a plot of surface average roughness of a light-scatter zone defined by a first working surface of the light-guide strip of said one of the third and fourth light-guide modules at different distances from a first end of the light-guide strip toward a second end of the same.

Referring to FIG. 7, the difference between the light-guide strip 111 of each of the third and fourth light-guide modules 11c, 11d and that of each of the first and second light-guide modules 11a, 11b resides in that the light-guide strip 111 of each of the third and fourth light-guide modules 11c, 11d has the second length, which is marked by "$L_2$" and is 267 mm in this embodiment. The first and second lengths "$L_1$", "$L_2$" configure the touch-control zone 4 with a length-width ratio of 16:9. The first working surface 1115 of the light-guide strip 111 also has a width of 4 mm and a length-width ratio not smaller than 50. In the present embodiment, the length-width ratio of each of the third and fourth light-guide modules 11c, 11d is 267/4=66. Furthermore, referring to Table 2 and FIGS. 8 and 9, for the light-guide module 111 of each of the third and fourth light-guide modules 11c, 11d, the light-scatter zone 1115a of the first working surface 1115 is divided into a first subzone, which is adjacent to the first end 1111, and a second subzone, which is adjacent to the second end 1112. In the first subzone, the surface average roughness "Ra" increases from the first end 1111 toward the second end 1112. In the second subzone, the surface average roughness "Ra" is substantially equal to the surface average roughness "Ra" of the roughest portion (i.e., the leftmost portion) in the first subzone. It is to be noted that "d" represents a distance in millimeters from the first end 11 toward the second end 12.

TABLE 2

| d(mm) | 5 | 15 | 25 | 35 | 45 | 55 | 65 |
|---|---|---|---|---|---|---|---|
| Ra | 0.0029 | 0.041 | 0.0679 | 0.0782 | 0.095 | 0.1178 | 0.1078 |
| d(mm) | 75 | 85 | 95 | 105 | 115 | 125 | 135 |
| Ra | 0.1223 | 0.1365 | 0.1228 | 0.1152 | 0.1104 | 0.1378 | 0.1347 |
| d(mm) | 145 | 155 | 165 | 175 | 185 | 195 | 205 |
| Ra | 0.1082 | 0.1276 | 0.1284 | 0.1178 | 0.1031 | 0.1161 | 0.1218 |
| d(mm) | 215 | 225 | 235 | 245 | 255 | 265 | — |
| Ra | 0.1395 | 0.1461 | 0.1555 | 0.1612 | 0.1361 | 0.1087 | — |

Since the micro-scatter structures 1115b are formed by the irregular protrusions with a distribution density that increases toward the second end 1112 in the first subzone and that is substantially non-varying in the second subzone, and the distribution density of the irregular protrusions has a positive relation to light-scattering ability of the irregular protrusions, the extent of scattering by the irregular protrusions increases from the first end 1111 toward the second end 1112 in the first subzone, and stabilizes in the second subzone. The micro-scatter structures 1115b formed by the irregular protrusions cooperate with the reflecting element 112 to compensate in part for brightness reduction that occurs to the light in the light-guide strip 111 as it propagates away from the light source.

For each of the light-guide modules 11a-11d, the reflecting element 112 is interposed between the light-guide strip 111 and the housing 113, and is secured to the housing 113. The first end 1111 (i.e., the light-entry surface 1113), the second end 1112, and the light-exit surface 1114 of the light-guide strip 111 are not shielded by the reflecting element 112. The reflecting element 112 has first and second reflecting portions 1121, 1122 parallel to each other and serving to reflect light that exits from the first and second working surfaces 1115, 1116, respectively, and a third reflecting portion 1123 interconnecting the first and second reflecting portions 1121, 1122 and serving to reflect light that exits from the rear surface 1117. The first, second, and third reflecting portions 1121, 1122, 1123 extend in the first direction (X) and cooperate to form a first receiving space 1124 for receiving the light-guide strip 111. In this embodiment, the first, second, and third reflecting portions 1121, 1122, 1123 are formed from highly reflective sheets, and are preferably spaced apart from the light-guide strip 111 by respective air gaps. Preferably, the first, second, and third reflecting portions 1121, 1122, 1123 are paper sheets with a reflectivity higher than 80%. The paper sheets have non-specular surfaces, which favour scattering of light, such that the reflecting element 112 is able to reflect light that exits from the first and second working surfaces 1115, 1116 and the rear surface 1117 back into the light-guide strip 111, thereby forcing light in the light-guide strip 111 to substantially exit via the light-exit surface 1114 so as to improve the light-extraction efficiency of the light-guide strip 111.

Since the distribution density of the irregular protrusions (i.e., the light scattering ability of the irregular protrusions) increases from the first end 1111 toward the second end 1112, and the reflecting element 112 serves to reflect light that exits from the first working surface 1115, the second working surface 1116, and the rear surface 1117 back into the light-guide strip 111, light extraction at portions of the light-exit surface 1114 farther from a light source may be augmented. Furthermore, the light that exits from the light-exit surface 1114 exhibits relatively weak or no directivity due to the irregularity of the irregular protrusions forming the micro-scatter structures 152.

The housing 113 is adapted to receive the light-guide strip 111 and the reflecting element 112, and includes first, second, third, and fourth sections 1131-1134 serving to shield the first, second, and third reflecting portions 1121-1123 of the reflecting element 112 and the second end 1112 of the light-guide strip 111, respectively. The third section 1133 extends in the first direction (X) and interconnects the first and second sections 1131, 1132. The fourth section 1134 is connected to the first, second, and third sections 1131-1133. The first, second, third, and fourth sections 1131-1134 cooperate to form a second receiving space 1135 for receiving the light-guide strip 111 and the reflecting element 112.

In the present embodiment, the housing 113, to which the reflecting element 112 is secured, is made of metal. The housing 113 may be configured in relation to the reflecting element 112 to ensure that the air gap is present between the first working surface 1115 and the first reflecting portion 1121, between the second working surface 1116 and the second reflecting portion 1122, and between the rear surface 1117 and the third reflecting portion 1123, such that the first, second, and third reflecting portions 1121-1123 are able to reflect the light that exits via the corresponding surfaces 1115-1117 back into the light-guide strip 111.

The diffuser 114 is formed with a hole for receiving the housing 113, and serves to scatter light that exits from the light-exit surface 1114. Moreover, through the use of the diffuser 114, the light-guide strip 111, the reflecting element 112, and the housing 113 may be integrated into a single product. Furthermore, the diffuser 114 may be stained with different colors according to design needs. It is worth noting that, in other embodiments, if only the scattering effect is to be achieved, the diffuser 114 may be a diffuser strip disposed corresponding to the light-exit surface 1114.

The light-extinguishing element 115 is disposed inside the second receiving space 1135, is substantially interposed between the fourth section 1134 and the second end 1112, and serves to absorb light that exits via the second end 1112.

As shown in FIG. 1, the first and fourth light-guide modules 11a, 11d define a first corner "C1", and the second and third light-guide modules 11b, 11c define a second corner "C2" diagonally opposite to the first corner "C1". It is to be noted that the first and second corners "C1", "C2" do not overlap with the touch-control zone 4. For each of the first and fourth light-guide modules 11a, 11d, the light-entry surface 1113 of the light-guide strip 111 is oriented toward the first corner "C1", and the light-exit surface 1114 of the light-guide strip 111 is oriented toward the touch-control zone 4. For each of the second and third light-guide modules 11b, 11c, the light-entry surface 1113 of the light-guide strip 111 is oriented toward the second corner "C2", and the light-exit surface 1114 of the light-guide strip 111 is oriented toward the touch-control zone 4.

Figure 10:
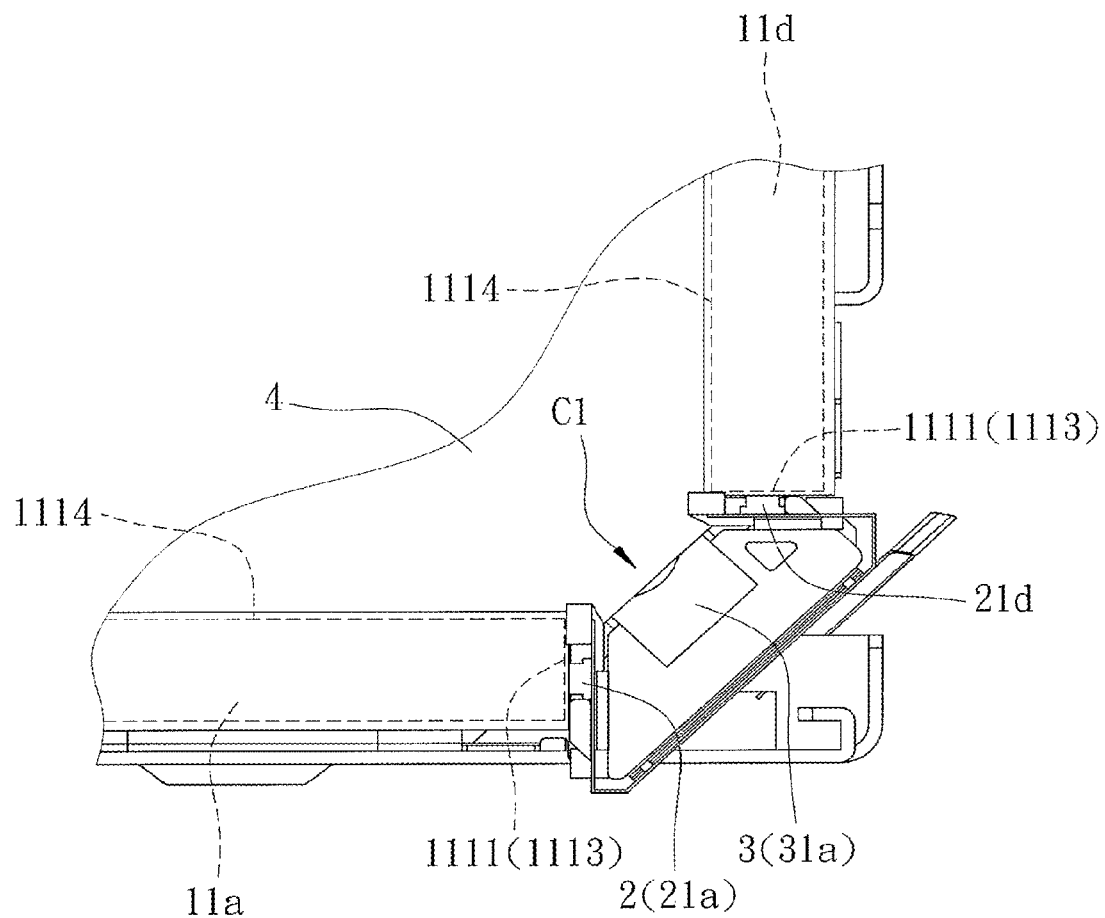
FIG. 10 is a fragmentary schematic view to show a first corner of a touch-control zone.
Figure 11:
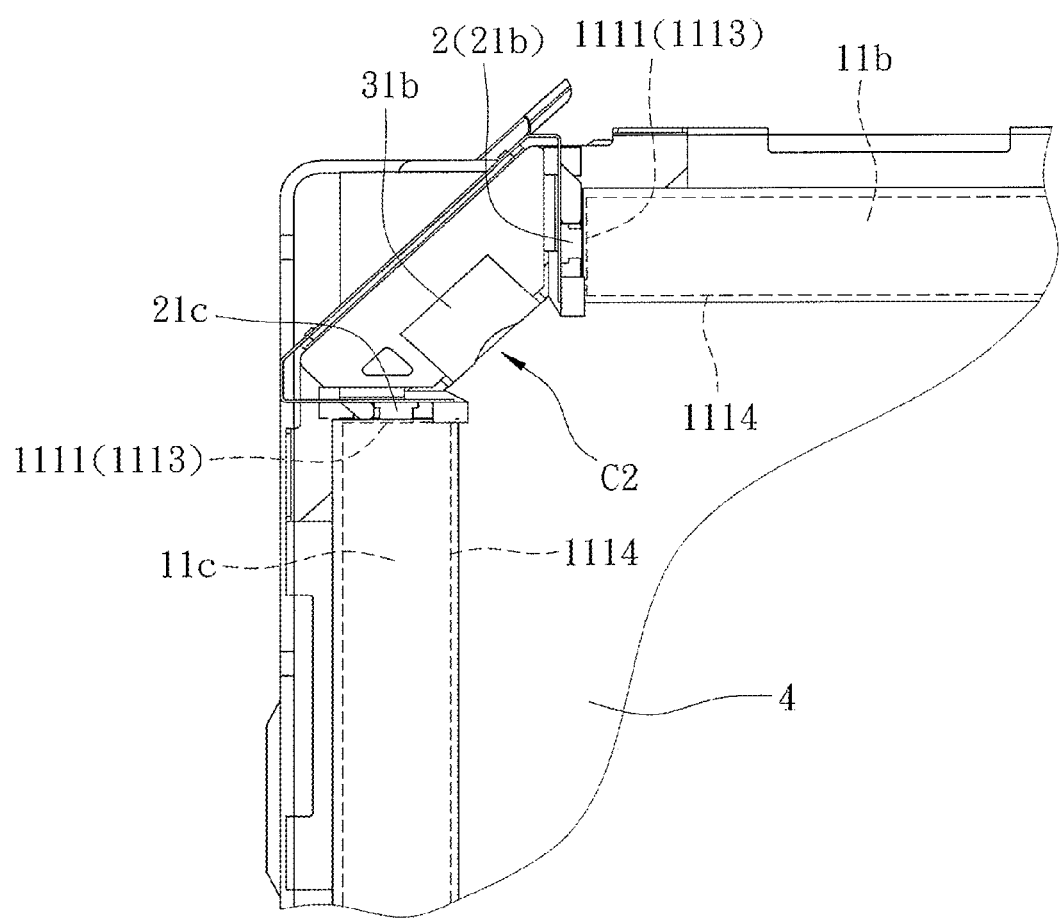
FIG. 11 is a fragmentary schematic view to show a second corner of the touch-control zone.

Referring to FIGS. 10 and 11, the light-emitting unit 2 includes first, second, third and fourth light-emitting modules 21a-21d, the first and fourth light-emitting modules 21a, 21d being disposed at the first corner "C1", the second and third light-emitting modules 21b, 21c being disposed at the second corner "C2". Each of the light-emitting modules 21a-21d is oriented toward the light-entry surface 1113 of the light-guide strip 111 of a corresponding one of the light-guide modules 11a-11d such that light emitted by each of the light-emitting modules 21a-21d is able to enter into and exit from the light-guide strip 111 of the corresponding one of the light-guide modules 11a-11d via the light-entry surface 1113 and the light-exit surface 1114, respectively, and to subsequently enter the touch-control zone 4. In this embodiment, each of the light-emitting modules 21 includes at least one light-emitting diode.

Figure 12:
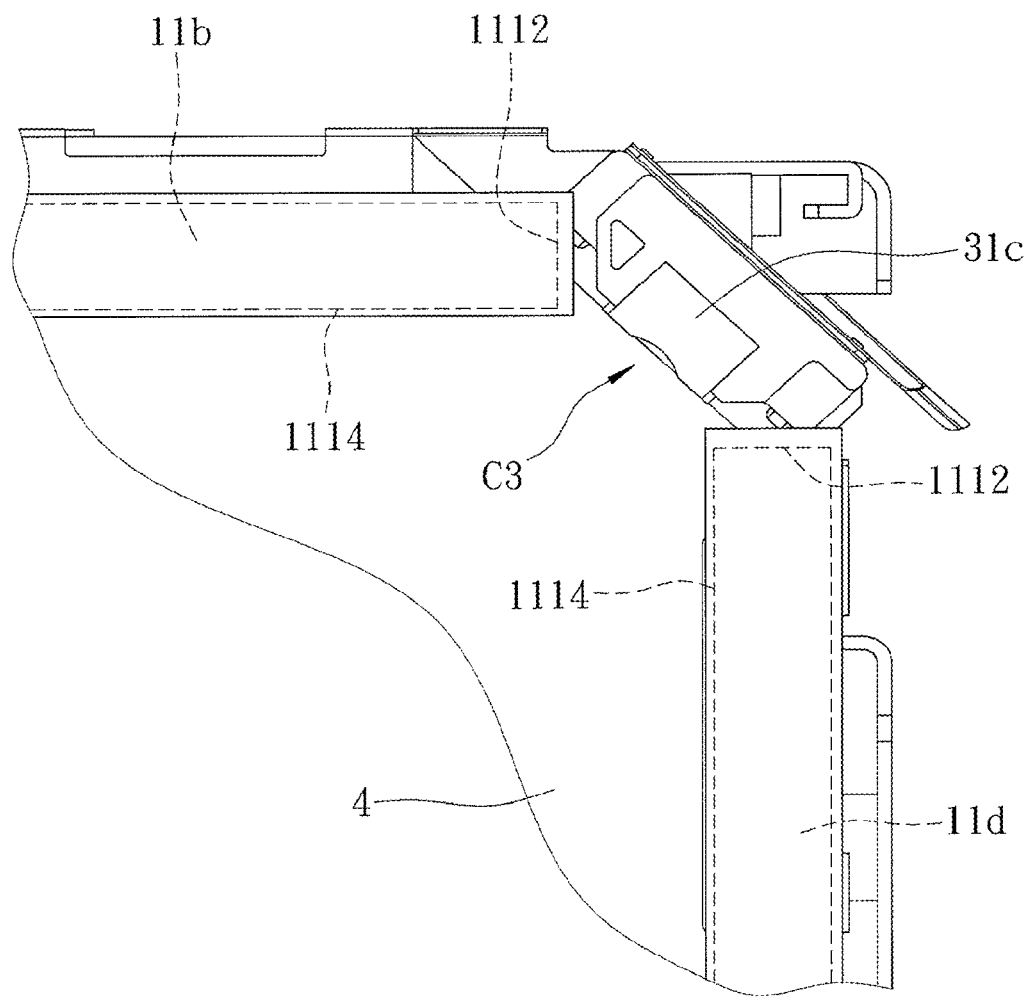
FIG. 12 is a fragmentary schematic view to show a third corner of the touch-control zone.

The second and fourth light-guide modules 11b, 11d further define a third corner "C3". It should be noted that the third corner "C3" does not overlap with the touch-control zone 4. Further referring to FIG. 12, the sensor unit 3 includes first, second, and third image-acquisition modules 31a-31c that have views of field wider than 90 degrees, that are disposed respectively at the first, second, and third corners "C1-C3", and that are oriented toward the touch-control zone 4, respectively. In such a configuration, the image-acquisition modules 31a-31c are operable to capture images of one or more pointers in the touch-control zone 4. In this embodiment, the first image-acquisition module 31a is interposed between the first and fourth light-emitting modules 21a, 21d, and the second image-acquisition module 31b is interposed between the second and third light-emitting modules 21b, 21c.

Figure 13:
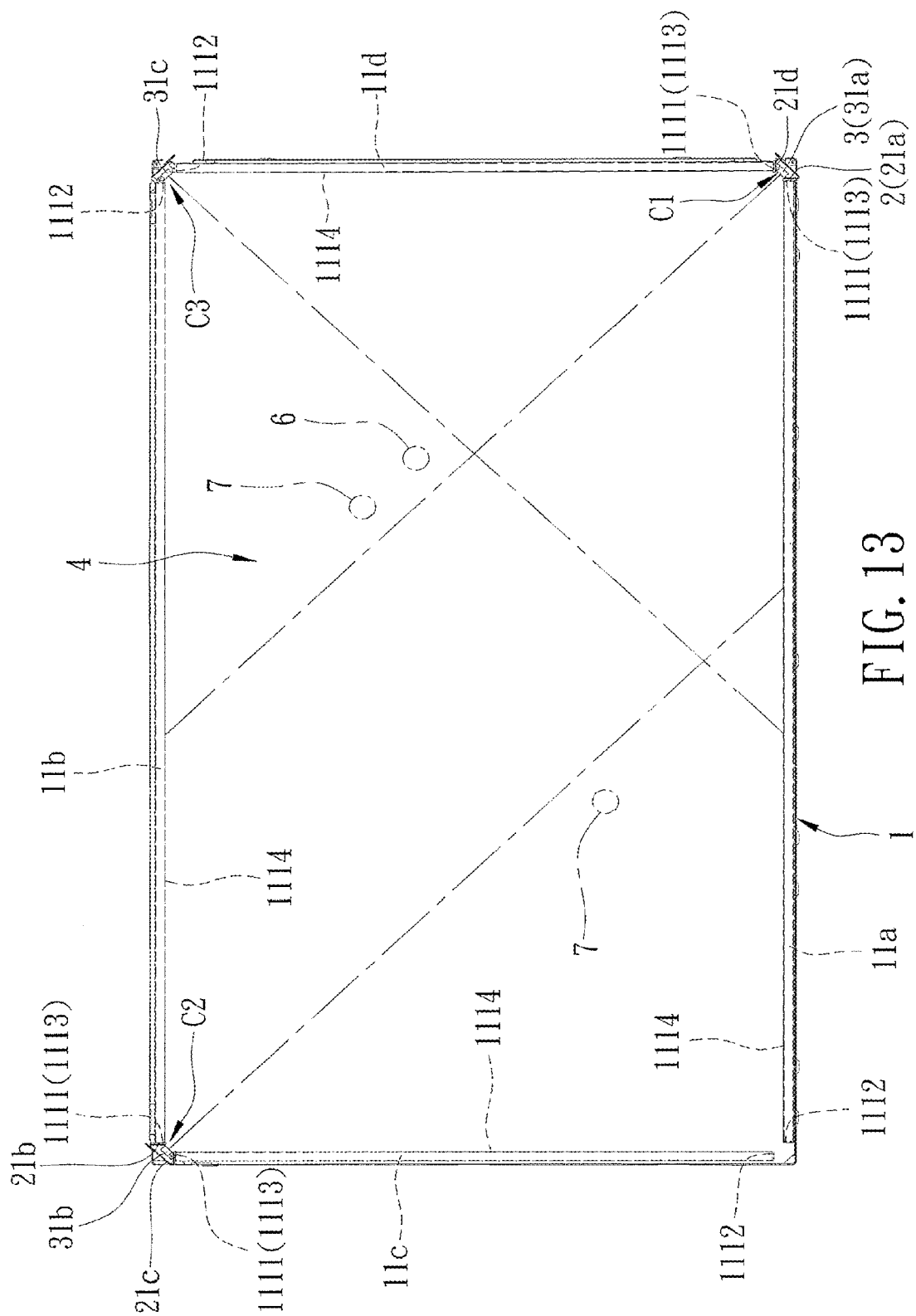
FIG. 13 is a schematic view to show the touch-control zone.

Referring to FIG. 13, the second and third image acquisition modules 31b, 31c are disposed at specific positions relative to the first light-guide module 11a, respectively. During operation, light emitted by the first light-emitting module 21a enters the touch-control zone 4 via the first light-guide module 11a. Thus, each of images captured by the second and third image acquisition modules 31b, 31c has a bright band portion, which is attributed to light exiting the first light guide module 11a. In this embodiment, the second image acquisition module 31b has an optical axis that forms an included angle of 45 degrees with each of the second and third light-guide modules 11b, 11c, and the third acquisition module 31c has an optical axis that forms an included angle 45 degrees with each of the second and fourth light-guide modules 11b, 11d. The optical axes of the second and third image acquisition modules 31b, 31c intersect independently with the first light-guide module 11a. Such a configuration ensures that light that exits via the diffuser 114 of the first light-guide module 11a passes through both sides of each of the optical axes and subsequently enters the second and third image-acquisition modules 31b, 31c.

Furthermore, the first and third image acquisition modules 31a, 31c are disposed at specific positions relative to the third light-guide module 11c, respectively. During operation, light emitted by the third light-emitting module 21c enters the touch-control zone 4 via the third light-guide module 11c. Thus, each of images captured by the first and third image acquisition modules 31a, 31c has a bright band portion, which is attributed to light exiting the third light guide module 11c. In this embodiment, the first image acquisition module 31a has an optical axis that forms an included angle of 45 degrees with each of the first and fourth light-guide modules 11a, 11d. The optical axes of the first and third image acquisition modules 31a, 31c do not intersect with the third light-guide module 11c. Such a configuration ensures that light that exits via the diffuser 114 of the third light-guide module 11c passes through one side of each of the optical axes and subsequently enters the first and third image-acquisition modules 31a, 31c.

Figure 14:
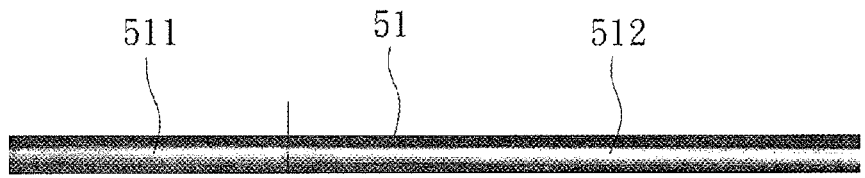
FIG. 14 shows an image captured by a first image acquisition module of a sensor unit of the optical touch-control system.

FIG. 14 shows an image 51 captured by the first image acquisition module 31a. The image 51 thus captured has first and second bright band portions 511, 512 that correspond to the third and second light-guide modules 11c, 11b, respectively. The leftmost and rightmost sections of the first bright band portion 511 correspond to the second and first ends 1112, 1111 of the light-guide strip 111 of the third light-guide module 11c, respectively. The leftmost and rightmost sections of the second bright band portion 512 correspond to the first and second ends 1111, 1112 of the light-guide strip 111 of the second light-guide module 11b, respectively.

Figure 15:
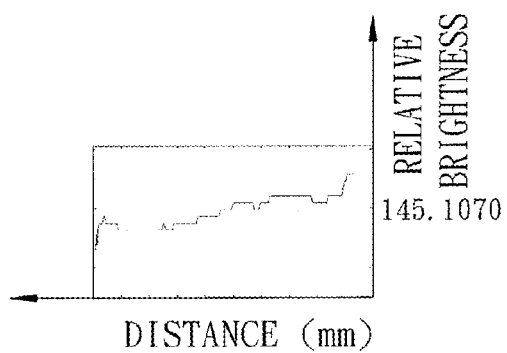
FIG. 15 is a plot of relative brightness distribution along a first bright band portion of the image captured by the first image acquisition module.

Shown in FIG. 15 is a plot of relative brightness distribution along the first bright band portion 511, which shows an average relative brightness of 145.1070. In such a configuration, a difference between a maximum relative brightness and the average relative brightness is 61.6647 (i.e., 42.4% relative to the average relative brightness), and a difference between the average relative brightness and a minimum relative brightness is 63.1316 (i.e., 43.5% relative to the average relative brightness). It is apparent that the difference between the maximum relative brightness and the average relative brightness, and that between the average relative brightness and the minimum relative brightness, are smaller than 50% of the average relative brightness. That is to say, a distribution curve of the relative brightness measured for the light-guide strip 111 of the third light-guide module 11c, from the first end 1111 to the second end 1112, is substantially flat.

Figure 16:
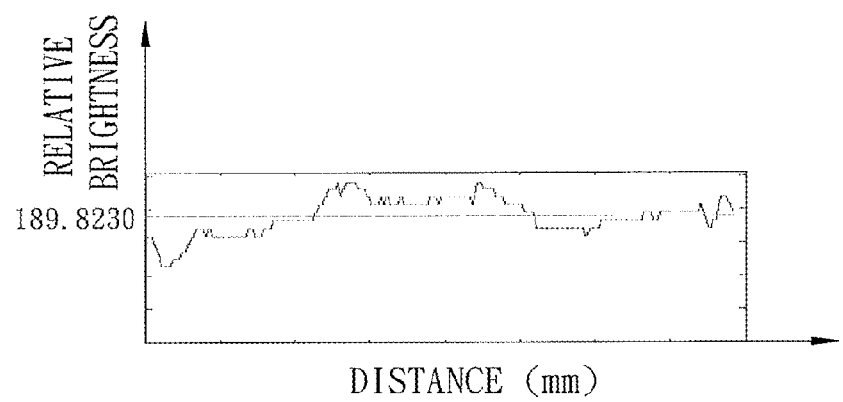
FIG. 16 is a plot of relative brightness distribution along a second bright band portion of the image captured by the first image acquisition module.

Shown in FIG. 16 is a plot of relative brightness distribution along the second bright band portion 512, which shows an average relative brightness of 189.8230. In such a configuration, a difference between a maximum relative brightness and the average relative brightness is 50.1769 (i.e., 26.4% relative to the average relative brightness), and a difference between the average relative brightness and a minimum relative brightness is 75.6761 (i.e., 39.8% relative to the average relative brightness). It is apparent that the difference between the maximum relative brightness and the average relative brightness, and that between the average relative brightness and the minimum relative brightness, are smaller than 50% of the average relative brightness. That is to say, a distribution curve of the relative brightness measured for the light-guide strip 111 of the second light-guide module 11b, from the first end 1111 to the second end 1112, is substantially flat.

Therefore, in such a configuration, images captured by the first image-acquisition module 31a have a substantially uniform relative brightness distribution.

Figure 17:
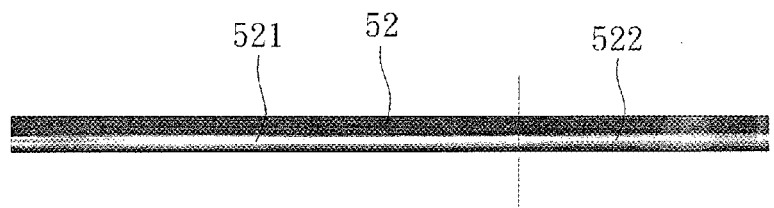
FIG. 17 shows an image captured by a third image acquisition module of the sensor unit of the optical touch-control system.

FIG. 17 shows an image 52 captured by the third image acquisition module 31c. The image 52 thus captured has first and second bright band portions 521, 522 that correspond to the first and third light-guide modules 11a, 11c, respectively. The leftmost and rightmost sections of the first bright band portion 521 correspond to the first and second ends 1111, 1112 of the light-guide strip 111 of the first light-guide module 11a, respectively. The leftmost and rightmost sections of the second bright band portion 522 correspond to the second and first ends 1112, 1111 of the light-guide strip 111 of the third light-guide module 11c, respectively.

Figure 18:
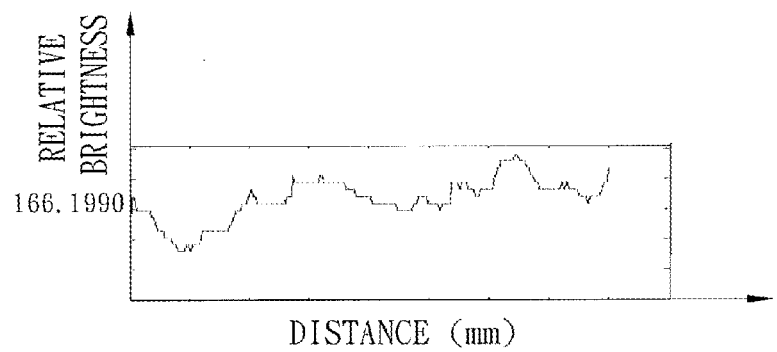
FIG. 18 is a plot of relative brightness distribution along a first bright band portion of the image captured by the third image acquisition module.

Shown in FIG. 18 is a plot of relative brightness distribution along the first bright band portion 521, which shows an average relative brightness of 166.1990. In such a configuration, a difference between a maximum relative brightness and the average relative brightness is 73.8013 (i.e., 44.4% relative to the average relative brightness), and a difference between the average relative brightness and a minimum relative brightness is 80.2236 (i.e., 48.2% relative to the average relative brightness). It is apparent that the difference between the maximum relative brightness and the average relative brightness, and that between the average relative brightness and the minimum relative brightness, are smaller than 50% of the average relative brightness. That is to say, a distribution curve of the relative brightness measured for the light-guide strip 111 of the first light-guide module 11a, from the first end 1111 to the second end 1112, is substantially flat.

Figure 19:
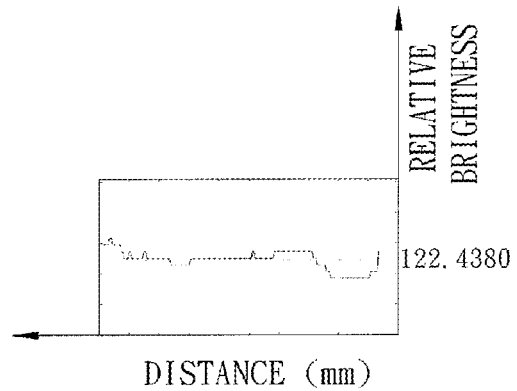
FIG. 19 is a plot of relative brightness distribution along a second bright band portion of the image captured by the third image acquisition module.

Shown in FIG. 19 is a plot of relative brightness distribution along the second bright band portion 522, which shows an average relative brightness of 122.4380. In such a configuration, a difference between a maximum relative brightness and the average relative brightness is 36.9660 (i.e., 30.1% relative to the average relative brightness), and a difference between the average relative brightness and a minimum relative brightness is 29.9352 (i.e., 24.4% relative to the average relative brightness). It is apparent that the difference between the maximum relative brightness and the average relative brightness, and that between the average relative brightness and the minimum relative brightness, are smaller than 50% of the average relative brightness. That is to say, a distribution curve of the relative brightness measured for the light-guide strip 111 of the third light-guide module 11c, from the first end 1111 to the second end 1112, is substantially flat.

Therefore, in such a configuration, images captured by the third image-acquisition module 31a have a substantially uniform relative brightness distribution.

In addition, it is apparent from FIGS. 15 and 19 that, for each of the first and third image acquisition modules 31a, 31c, light emitted from the third light-guide module 11c appears to have a substantially uniform distribution, and that the first bright band portion 511 of the image 51 captured by the first image acquisition module 31a and the second bright band portion 522 of the image 52 captured by the third image acquisition module 31c have different values of average relative brightness.

Figure 20:
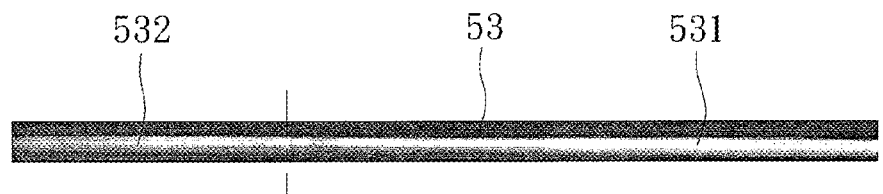
FIG. 20 shows an image captured by a second image acquisition module of the sensor unit of the optical touch-control system.

FIG. 20 shows an image 53 captured by the second image acquisition module 31b. The image 53 thus captured has first and second bright band portions 531, 532 that correspond to the first and fourth light-guide modules 11a, 11d, respectively. The leftmost and rightmost sections of the first bright band portion 531 correspond to the first and second ends 1111, 1112 of the light-guide strip 111 of the first light-guide module 11a, respectively. The leftmost and rightmost sections of the second bright band portion 532 correspond to the second and first ends 1112, 1111 of the light-guide strip 111 of the fourth light-guide module 11d, respectively.

Figure 21:
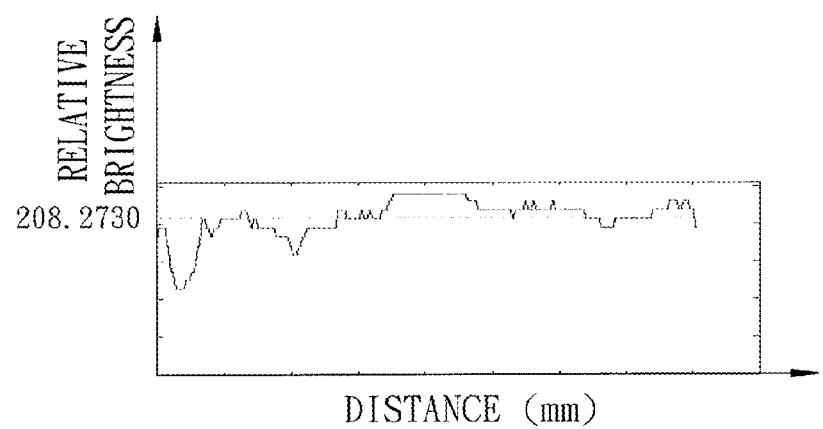
FIG. 21 is a plot of relative brightness distribution along a first bright band portion of the image captured by the second image acquisition module.

Shown in FIG. 21 is a plot of relative brightness distribution along the first bright band portion 531, which shows an average relative brightness of 208.2730. In such a configuration, a difference between a maximum relative brightness and the average relative brightness is 31.7266 (i.e., 15.2% relative to the average relative brightness), and a difference between the average relative brightness and a minimum relative brightness is 94.1264 (i.e., 45.1% relative to the average relative brightness). It is apparent that the difference between the maximum relative brightness and the average relative brightness, and that between the average relative brightness and the minimum relative brightness, are smaller than 50% of the average relative brightness. That is to say, a distribution curve of the relative brightness measured for the light-guide strip 111 of the first light-guide module 11a, from the first end 1111 to the second end 1112, is substantially flat.

In addition, it is apparent from FIGS. 18 and 21 that, for each of the second and third image acquisition modules 31b, 31c, light emitted from the first light-guide module 11a appears to have a substantially uniform distribution, and that the first bright band portion 531 of the image 53 captured by the second image acquisition module 31b and the first bright band portion 521 of the image 52 captured by the third image acquisition module 31c have different values of average relative brightness.

Figure 22:
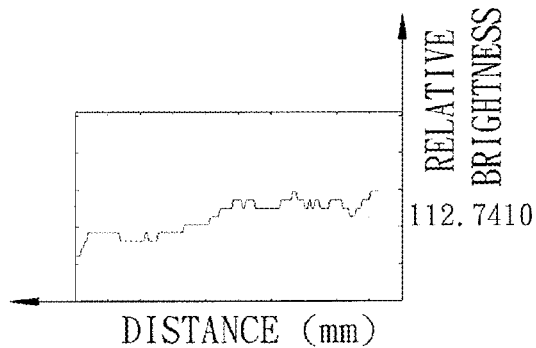
FIG. 22 is a plot of relative brightness distribution along a second bright band portion of the image captured by the second image acquisition module.

Shown in FIG. 22 is a plot of relative brightness distribution along the second bright band portion 532, which shows an average relative brightness of 122.7410. In such a configuration, a difference between a maximum relative brightness and the average relative brightness is 35.1304 (i.e., 31.1% relative to the average relative brightness), and a difference between the average relative brightness and a minimum relative brightness is 51.1280 (i.e., 45.3% relative to the average relative brightness). It is apparent that the difference between the maximum relative brightness and the average relative brightness, and that between the average relative brightness and the minimum relative brightness, are smaller than 50% of the average relative brightness. That is to say, a distribution curve of the relative brightness measured for the light-guide strip 111 of the fourth light-guide module 11d, from the first end 1111 to the second end 1112, is substantially flat.

Therefore, for each of the image acquisition modules 31a-31c, each of the first and second bright band portions in each image captured by the image acquisition module satisfies:

$$E_{max} - E_{mean} < 0.5 E_{mean}$$

$$E_{mean} - E_{min} < 0.5 E_{mean}$$

where $E_{max}$, $E_{mean}$, and $E_{min}$ represent a maximum relative brightness value, an average relative brightness value, and a minimum relative brightness value of the bright band portion in the image captured by the image acquisition module, respectively.

Furthermore, for each pair of images captured respectively by each adjacent pair of the image acquisition modules 31a-31c, the bright band portions of the pair of images that correspond to the same one of the light-guide modules 11a, 11c satisfy:

$$E_{1,mean} \neq E_{2,mean}$$

where $E_{1,mean}$ and $E_{2,mean}$ are average relative brightness values of the bright band portions of the pair of images that correspond to the same one of the light-guide modules 11a, 11c, respectively. That is to say, the bright band portions of the pair of images that correspond to the same one of the light-guide modules 11a, 11c have different average relative brightness values.

Thus, light entering the touch-control zone 4 via the light-exit surface 1114 of each of the light-guide modules 10a-10d has a substantially uniform illumination distribution, and each of images captured by the image acquisition modules 31a-31c has a substantially uniform brightness distribution, thereby avoiding occurrence of situation where one or more pointers in the touch-control zone 4 are erroneously detected in view of great variation in brightness distribution.

Figure 23:
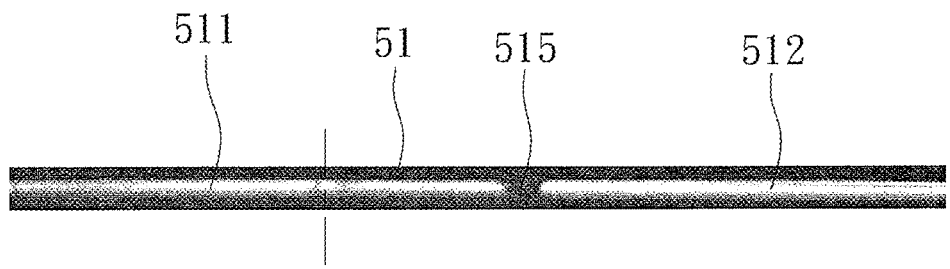
FIG. 23 shows an image captured by the first image acquisition module in a first scenario illustrated in FIG. 13, where a pointer is disposed in the touch-control zone.
Figure 24:
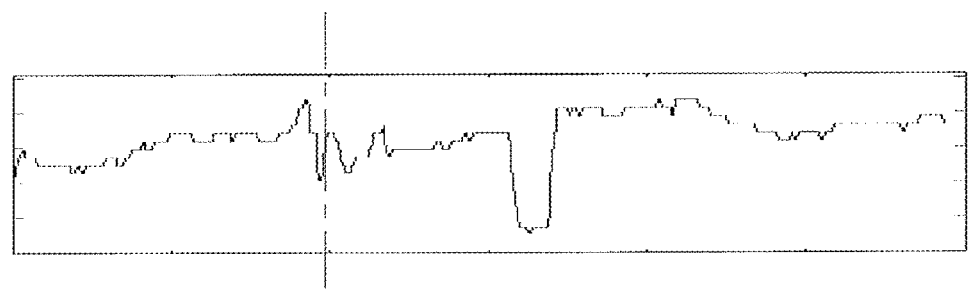
FIG. 24 is a plot of relative brightness distribution along the first and second bright band portions of the image captured by the first image acquisition module in the first scenario.

Shown in FIG. 23 is an image 51 captured by the first image acquisition module 31a in a first scenario where a pointer 6 (e.g., a finger) is disposed in the touch-control zone 4 (see FIG. 13). The second bright band portion 512 of the image 51 thus captured contains a shaded section 515 that is relatively dark and that corresponds to the pointer 6. Shown in FIG. 24 is a plot of relative brightness distribution along the first and second bright band portions 511, 512. The second bright band portion 512 and the shaded section 515 thereof have average relative brightnesses of 189.8230 and 35.3117, respectively, which have a difference of 154.5113 (i.e., greater than 50% of the average relative brightness of the second bright band portion 512).

Figure 25:
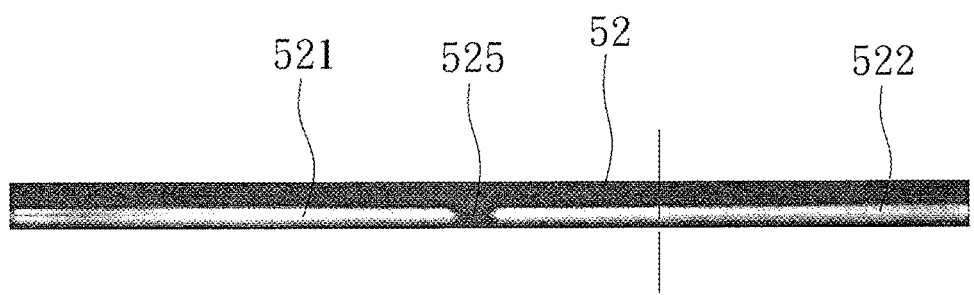
FIG. 25 shows an image captured by the third image acquisition module in the first scenario.
Figure 26:
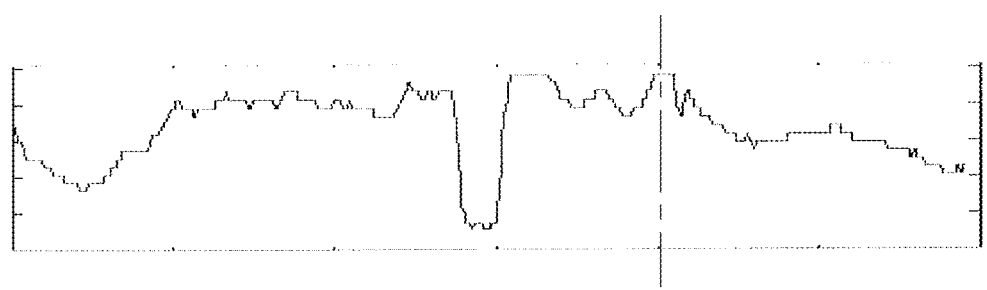
FIG. 26 is a plot of relative brightness distribution along the first and second bright band portions of the image captured by the third image acquisition module in the first scenario.

Shown in FIG. 25 is an image 52 captured by the third image acquisition module 31c when the pointer 6 is disposed in the touch-control zone 4. The first bright band portion 521 of the image 52 thus captured contains a shaded section 525 that is relatively dark and that corresponds to the pointer 6. Shown in FIG. 26 is a plot of relative brightness distribution along the first and second bright band portions 521, 522. In such a scenario, the first bright band portion 521 and the shaded section 525 thereof have average relative brightnesses of 166.1990 and 35.3117, respectively, which have a difference of 130.8873 (i.e., greater than 50% of the average relative brightness of the first bright band portion 521).

Figure 27:
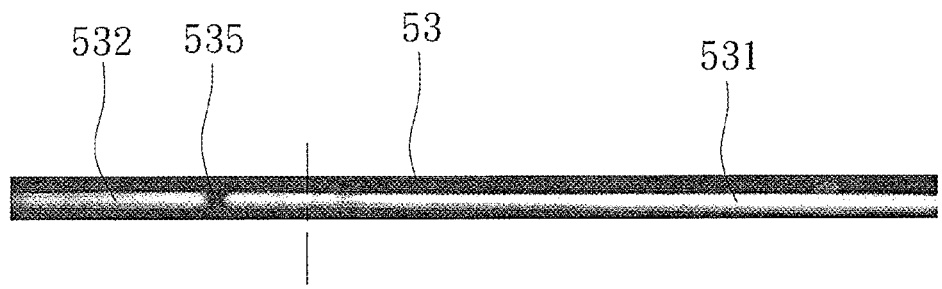
FIG. 27 shows an image captured by the second image acquisition module in the first scenario.
Figure 28:
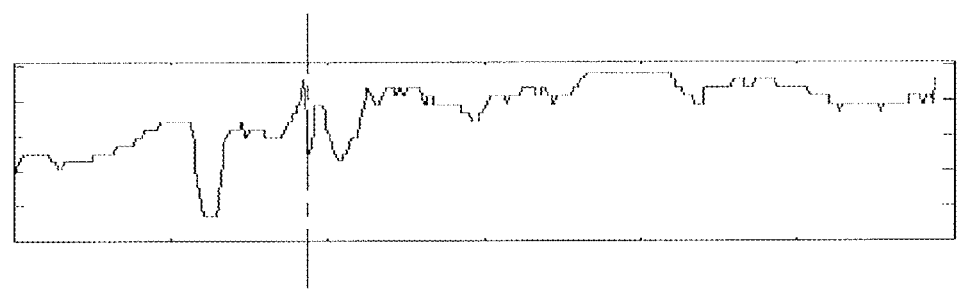
FIG. 28 is a plot of relative brightness distribution along the first and second bright band portions of the image captured by the second image acquisition module in the first scenario.

Shown in FIG. 27 is an image 53 captured by the second image acquisition module 31b when the pointer 6 is disposed in the touch-control zone 4. The second bright band portion 532 of the image 53 thus captured contains a shaded section 535 that is relatively dark and that corresponds to the pointer 6. Shown in FIG. 28 is a plot of relative brightness distribution along the first and second bright band portions 531, 532. In such a scenario, the second bright band portion 532 and the shaded section 535 thereof have average relative brightnesses of 112.7410 and 35.3117, respectively, which have a difference of 77.4293 (i.e., greater than 50% of the average relative brightness of the second bright band portion 532).

Thus, position of the pointer 6 relative to the touch-control zone 4 may be determined according to a trigonometric relation among the shaded sections 515, 525, 535 of the bright band portions 512, 521, 532.

Figure 29:
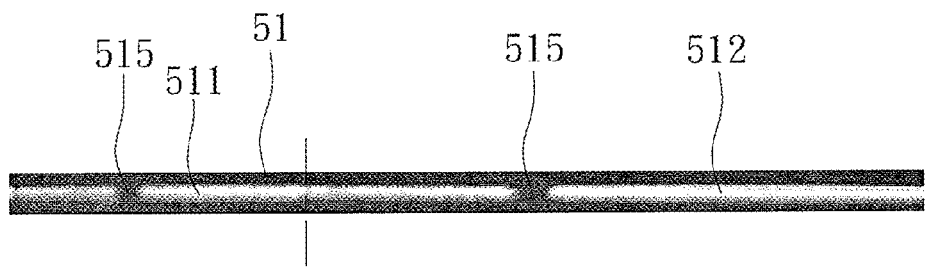
FIG. 29 shows an image captured by the first image acquisition module in a second scenario illustrated in FIG. 13, where two pointers are disposed in the touch-control zone.
Figure 30:
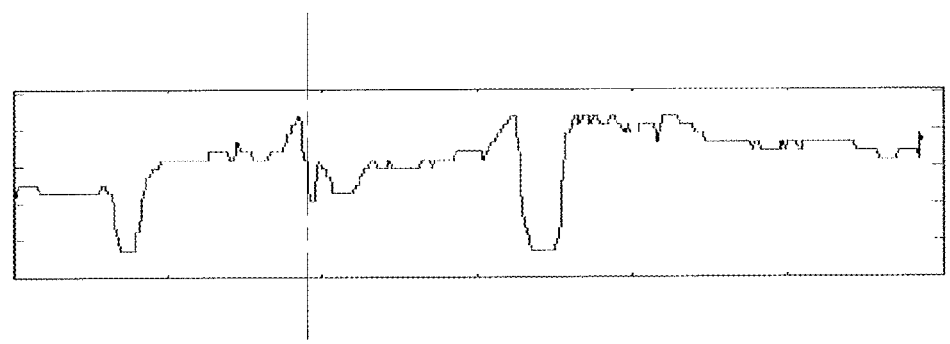
FIG. 30 is a plot of relative brightness distribution along the first and second bright band portions of the image captured by the first image acquisition module in the second scenario.

Shown in FIG. 29 is an image 51 captured by the first image acquisition module 31a in a second scenario where two pointers 7 (e.g., fingers) are disposed in the touch-control zone 4 (see FIG. 13). In the second scenario, each of the first and second bright band portions 511, 512 of the image 51 thus captured contains a shaded section 515 that is relatively dark and that corresponds to a respective one of the pointers 7. Shown in FIG. 30 is a plot of relative brightness distribution along the first and second bright band portions 511, 512. The first bright band portion 511 and the shaded section 515 thereof have average relative brightnesses of 145.1070 and 35.3117, respectively, which have a difference of 109.7953 (i.e., greater than 50% of the average relative brightness of the first bright band portion 511). The second bright band portion 512 and the shaded section 515 thereof have average relative brightnesses of 189.8230 and 35.3117, respectively, which have a difference of 154.5113 (i.e., greater than 50% of the average relative brightness of the second bright band portion 512).

Figure 31:
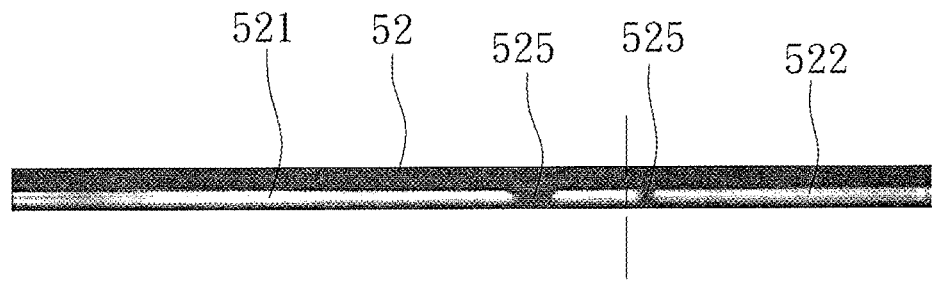
FIG. 31 shows an image captured by the third image acquisition module in the second scenario.
Figure 32:
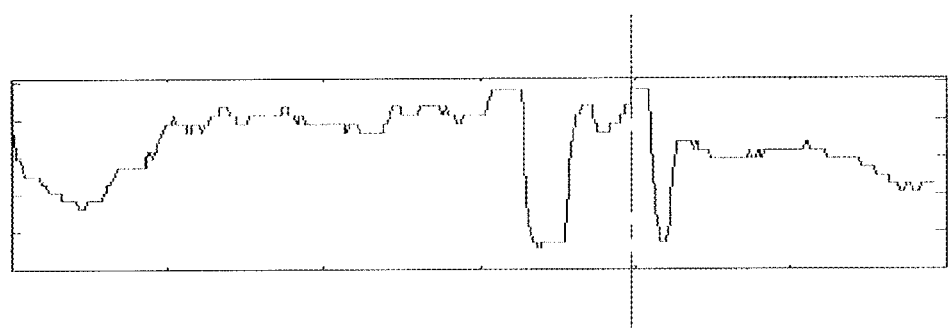
FIG. 32 is a plot of relative brightness distribution along the first and second bright band portions of the image captured by the third image acquisition module in the second scenario.

Shown in FIG. 31 is an image 52 captured by the third image acquisition module 31c in the second scenario. Each of the first and second bright band portions 521, 522 of the image 52 thus captured contains a shaded section 525 that is relatively dark and that corresponds to a respective one of the pointers 7. Shown in FIG. 32 is a plot of relative brightness distribution along the first and second bright band portions 521, 522. The first bright band portion 521 and the shaded section 525 thereof have average relative brightnesses of 166.1990 and 35.3117, respectively, which have a difference of 130.8873 (i.e., greater than 50% of the average relative brightness of the first bright band portion 521). The second bright band portion 522 and the shaded section 525 thereof have average relative brightnesses of 122.4380 and 35.3117, respectively, which have a difference of 87.1263 (i.e., greater than 50% of the average relative brightness of the second bright band portion 522).

Figure 33:
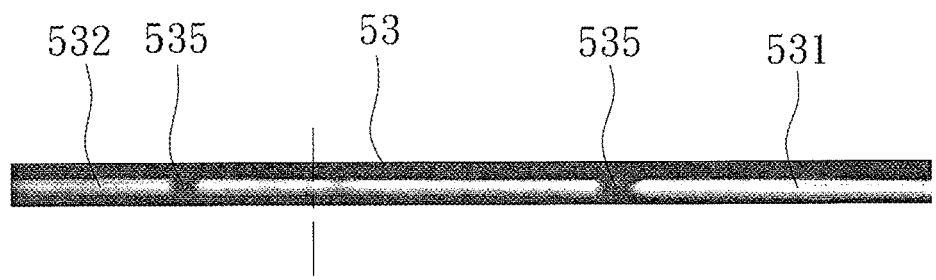
FIG. 33 shows an image captured by the second image acquisition module in the second scenario.
Figure 34:
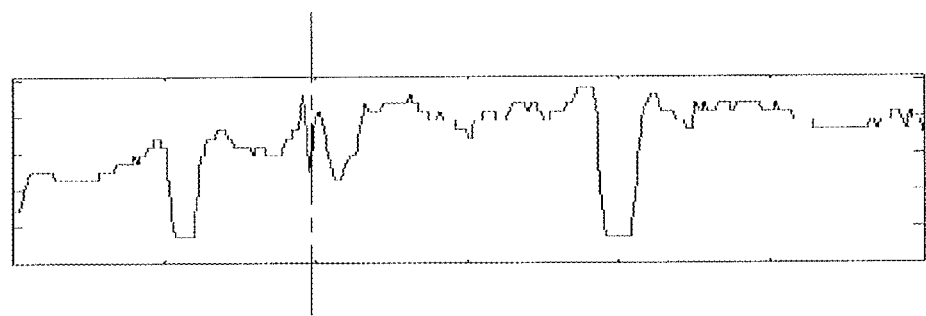
FIG. 34 is a plot of relative brightness distribution along the first and second bright band portions of the image captured by the second image acquisition module in the second scenario.

Shown in FIG. 33 is an image 53 captured by the second image acquisition module 31b in the second scenario. Each of the first and second bright band portions 531, 532 of the image 53 thus captured contains a shaded section 535 that is relatively dark and that corresponds to a respective one of the pointers 7. Shown in FIG. 34 is a plot of relative brightness distribution along the first and second bright band portions 531, 532. The first bright band portion 531 and the shaded section 535 thereof have average relative brightnesses of 208.2730 and 35.3117, respectively, which have a difference of 172.9613 (i.e., greater than 50% of the average relative brightness of the first bright band portion 531). The second bright band portion 532 and the shaded section 535 thereof have average relative brightnesses of 112.7410 and 35.3117, respectively, which have a difference of 77.4293 (i.e., greater than 50% of the average relative brightness of the second bright band portion 532).

Thus, positions of the pointers 7 relative to the touch-control zone 4 may be determined according to a trigonometric relation among the shaded sections 515, 525, 535.

In summary:

1) Since the first and fourth light-emitting modules 21a, 21d are disposed in the first corner "C1" and the second and third light-emitting modules 21b, 21c are disposed in the second corner "C2", the optical touch-control system of the present invention may have a simpler wiring configuration and thus may be easier to mass-produce relative to an optical touch-control system that has light-emitting modules disposed in all four corners.

2) Since the first and second image acquisition modules 31a, 31b are interposed between the first and fourth light-emitting modules 21a, 21d and between the second and third light-emitting modules 21b, 21c, respectively, and each of the light-emitting modules 21a-21d is oriented toward the light-entry surface 1113 of the light-guide strip 111 of the corresponding one of the light-guide modules 11a-11d instead of directly toward the touch-control zone 4, the first and second image acquisition modules 31a, 31b are not subjected to interference from the light emitted by the light-emitting modules 21a-21d.

3) By virtue of the configurations of the light-guide unit 1 and the light-emitting unit 2, light that exits via the light-exit surfaces 1114 has a relatively uniform distribution, such that the bright band portion in each of images 51-53 captured by the image acquisition modules 31a-31c has a relatively uniform brightness distribution, which facilitates accurate position determination of one or more pointers in the touch-control zone 4.

4) For the light-guide strip 111 of each of the light-guide modules 11a-11d, since the distribution density of the irregular protrusions (i.e., the light scattering ability of the irregular protrusions) increases from the first end 1111 toward the second end 1112, and the reflecting element 112 serves to reflect light that exits from the first working surface 1115, the second working surface 1116, and the rear surface 1117 back into the light-guide strip 10, light extraction at portions of the light-exit surface 1114 farther from the corresponding light-emitting modules 21a-21d may be augmented such that light that exits via the light-exit surface 1114 has a relatively uniform distribution and exhibits relatively weak or no directivity due to the irregularity of the irregular protrusion.

5) Currently, due to technical limitations, capacitive-type and resistive-type touch-screen techniques are generally used only for screen sizes that are below 14 inches. As for screen sizes that are larger than 20 inches, other touch-control techniques, such as optical touch-control systems, are employed. In the preferred embodiment, the light-guide strip 111 of each of the first and second light-guide modules 11a, 11b corresponds to a respective one of longitudinal sides of a 21-inch touch-screen, and the light-guide strip 111 of each of the third and fourth light-guide modules 11c, 11d corresponds to a respective one of lateral sides of the 21-inch touch-screen. It is noted that a conventional light-guide strip having a cross-section that varies along the length thereof may be unsuited in display applications where there are dimensional restrictions in terms of width and height of the strip. In the present invention, the light-guide strip 111 has a uniform cross-section along the length thereof, which makes it suitable for display applications where there are dimensional restrictions in terms of width and height of the strip.

6) In a conventional light-guide strip, a complex scattering structure is usually engraved in the rear surface opposite to the light-exit surface. However, since the light-guide strip has a slender design, the scattering structure in the rear surface having a slender area must be sufficiently large to result in an evident light-scattering effect. Accordingly, such a scattering structure can hardly be called a micro-structure, and a bright-dark pattern attributed to the macro scattering structure is visible from the light-exit surface, which has an adverse affect on brightness of light exiting the light-exit surface. In contrast, in the present invention, the light-scatter zone 1115a is defined in the first working surface 1115, which has a relatively large area compared to the rear surface 1117. In display applications with a width restriction of 4-10 mm and a height restriction of 1-4 mm, the width of the first working surface 1115 could be set to 4 mm and the height of the rear surface 17 could be set to 1.6 mm. Accordingly, the area of the first working surface 1115 could be more than twice the area of the rear surface 1117. Since the first working surface 1115 could provide a larger area to accommodate a large number of the micro-scatter structures 1115b, the micro-scatter structures 1115b need not be large to ensure the light-scattering effect, thereby avoiding the problem of a bright-dark pattern at the light-exit surface 1114.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical touch-control system comprising:
a light-guide unit including four light-guide modules that cooperate to define a touch-control zone and four corners, each of said light-guide modules including a light-guide strip having opposite first and second ends, a light-entry surface that is disposed at said first end, and a light-exit surface that extends between said first and second ends and that is oriented toward the touch-control zone, wherein for each of two of said light-guide modules that define a first one of the corners, said light-entry surface of said light-guide strip of said light-guide module is oriented toward the first one of the corners, and wherein for each of remaining two of said light-guide modules that define a second one of the corners diagonally opposite to the first one of the corners, said light-entry surface of said light-guide strip of said light-guide module is oriented toward the second one of the corners;
a light-emitting unit including four light-emitting modules, two of which are disposed in the first one of the corners, and remaining two of which are disposed in the second one of the corners, each of said light-emitting modules being oriented toward said light-entry surface of said light-guide strip of a corresponding one of said light-guide modules disposed in the same one of the corners, light that enters each of said light-guide modules via said light-entry surface thereof exiting from said light-guide module via said light-exit surface thereof; and
a sensor unit including first, second, and third image acquisition modules disposed respectively in the first and second ones of the corners and a remaining one of the corners, each of said first, second, and third image acquisition modules being oriented toward the touch-control zone.

2. The optical touch-control system as claimed in claim 1, wherein each image captured by each of said image acquisition modules when said light-emitting unit is activated and no pointer is disposed in the touch-control zone has a bright band portion that satisfies:

$$E_{max} - E_{mean} < 0.5 E_{mean}$$

$$E_{mean} - E_{min} < 0.5 E_{mean}$$

where $E_{max}$, $E_{mean}$, and $E_{min}$ represent a maximum relative brightness value, an average relative brightness value, and a minimum relative brightness value of the bright band portion.

3. The optical touch-control system as claimed in claim 2, wherein, for each pair of images captured respectively by each adjacent pair of said image acquisition modules, the bright band portions of the pair of images satisfy:

$$E_{1,mean} \approx E_{2,mean}$$

where $E_{1,mean}$ and $E_{2,mean}$ are average relative brightness values of the bright band portions of the pair of images, respectively.

4. The optical touch-control system as claimed in claim 1, wherein each of said first and second image acquisition modules has two lateral sides, said two of said light-emitting modules that are disposed in the first one of the corners being disposed respectively at said two lateral sides of said first image acquisition module, said two of said light-emitting modules that are disposed in the second one of the corners being disposed respectively at said two lateral sides of said second image acquisition module.

5. The optical touch-control system as claimed in claim 1, wherein, for each of said light-guide modules, said light-guide strip further has first and second working surfaces disposed parallel to each other and extending between said first and second ends of said light-guide strip, one of said first and second working surfaces defining a light-scatter zone and including a plurality of micro-scatter structures that are disposed within said light-scatter zone and that configure said light-scatter zone with a light-scattering ability that varies in a direction from said first end to said second end;
wherein each of said light-guide modules further includes a reflecting element disposed to reflect light that exits from said light-guide strip of said light-guide module via said first and second working surfaces back into said light-guide strip via said first and second working surfaces, respectively.

6. The optical touch-control system as claimed in claim 5, wherein said one of said first and second working surfaces has a length-width ratio not smaller than 50.

7. The optical touch-control system as claimed in claim 5, wherein each of said light-guide modules further includes a housing for receiving said light-guide strip and said reflecting element of said light-guide module, and a diffuser disposed corresponding to said light-exit surface and serving to scatter light that exits from said light-guide strip of said light-guide module via said light-exit surface.

8. The optical touch-control system as claimed in claim 7, wherein each of said light-guide modules further includes a light-extinguishing element disposed in said housing of said light-guide module at said second end of said light-guide strip of said light-guide module.

* * * * *